US011700309B2

(12) United States Patent
Yu et al.

(10) Patent No.: US 11,700,309 B2
(45) Date of Patent: Jul. 11, 2023

(54) NETWORK PARAMETER PROVISIONING FOR INSTANTIATION OF A NETWORK ENTITY

(71) Applicant: Alibaba Group Holding Limited, Grand Cayman (KY)

(72) Inventors: Xiaobo Yu, Beijing (CN); Dapeng Liu, Beijing (CN); Changming Bai, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 17 days.

(21) Appl. No.: 17/480,988

(22) Filed: Sep. 21, 2021

(65) Prior Publication Data

US 2022/0053057 A1   Feb. 17, 2022

(30) Foreign Application Priority Data

Aug. 13, 2020   (CN) .......................... 202010814518.4
Oct. 15, 2020   (CN) .......................... 202011105436.9

(51) Int. Cl.
*H04L 67/141* (2022.01)
*H04W 40/24* (2009.01)
(Continued)

(52) U.S. Cl.
CPC .......... *H04L 67/141* (2013.01); *H04W 4/025* (2013.01); *H04W 40/24* (2013.01); *H04W 76/10* (2018.02); *H04W 4/20* (2013.01)

(58) Field of Classification Search
CPC ..... H04L 47/14; H04L 47/141; H04L 47/147; H04L 47/72; H04L 41/0681; H04L 41/34;
(Continued)

(56) References Cited

U.S. PATENT DOCUMENTS 9,787,583 B2   10/2017   Kompella
9,953,296 B2   4/2018   Crimm et al.
(Continued)

FOREIGN PATENT DOCUMENTS

KR   WO_2022154372   *   7/2022   ......... H04L 41/0813
WO   WO2020068765 A1   4/2020

OTHER PUBLICATIONS

The International Search Report and Written Opinion for PCT Application No. PCT/US21/51323, dated Jun. 1, 2022, 13 pages.

Primary Examiner — Warner Wong
(74) Attorney, Agent, or Firm — Lee & Hayes, P.C.

(57) ABSTRACT

A method, an apparatus, an electronic device, and a storage medium for network communication are provided. A first network entity sends a first request message to a second network entity. The first request message includes at least one piece of first network parameter type information, and is used to enable the second network entity to be triggered to send a first message to a third network entity according to a preset event. The first message includes at least one portion of network parameter information corresponding to the first network parameter type information. The first network entity receives a first reply message returned by the second network entity in response to the first request message. Using the present disclosure, the first network entity can dynamically manage an instantiation of the third network entity, and the authority of the third network entity to obtain network parameters.

18 Claims, 14 Drawing Sheets

(51) Int. Cl.
*H04W 4/02* (2018.01)
*H04W 76/10* (2018.01)
*H04W 4/20* (2018.01)

(58) Field of Classification Search
CPC ....... H04W 40/00; H04W 40/24; H04W 4/00; H04W 4/025; H04W 76/00; H04W 76/10; H04W 4/20; H04W 28/00; H04W 28/0268; H04W 28/0827; H04W 28/0967; H04W 28/12; H04W 28/16; H04W 28/18; H04W 60/04; H04W 2027/0083
See application file for complete search history.

(56) References Cited

U.S. PATENT DOCUMENTS

| | | | |
|---|---|---|---|
| 10,104,672 B2 | 10/2018 | Shah | |
| 10,230,798 B2 | 3/2019 | Doraiswamy et al. | |
| 10,262,019 B1 | 4/2019 | Reiner et al. | |
| 10,341,868 B2 | 7/2019 | Ross et al. | |
| 11,252,259 B2 | 2/2022 | Ren et al. | |
| 11,632,312 B2 * | 4/2023 | Suthar | H04L 41/5054 709/223 |
| 2004/0168109 A1 * | 8/2004 | Ogura | H04L 43/00 714/47.1 |
| 2007/0248106 A1 * | 10/2007 | Liu | H04L 51/48 370/401 |
| 2008/0151911 A1 * | 6/2008 | Chen | H04L 12/189 370/400 |
| 2018/0242267 A1 * | 8/2018 | Jiang | H04J 3/0679 |
| 2020/0068653 A1 | 2/2020 | Li et al. | |
| 2020/0154350 A1 | 5/2020 | Dao et al. | |
| 2022/0022092 A1 * | 1/2022 | Puente Pestaña | H04W 28/0263 |

* cited by examiner

NETWORK PARAMETER PROVISIONING FOR INSTANTIATION OF A NETWORK ENTITY

CROSS REFERENCE TO RELATED PATENT APPLICATIONS

This application claims priority to Chinese Patent Application No. 202010814518.4, filed on 13 Aug. 2020, entitled "Network Communication Method, Apparatus, Electronic Device, and Storage Medium," and further claim priority to Chinese Patent Application No. 202011105436.9, filed on 15 Oct. 2020, entitled "Network Communication Method, Apparatus, Electronic Device, and Storage Medium," which are hereby incorporated by reference in their entirety.

TECHNICAL FIELD

The present disclosure relates to the technical fields of communications, and particularly to network communication methods, apparatuses, electronic devices, and storage media.

BACKGROUND

Edge computing is an evolution of cloud computing, and is different from centralized data centers. By deploying decentralized data centers at the edge of a network, data processing logic is brought closer to consumers.

Edge computing is considered to be one of the important ways to meet key performance indicators (KPI) in 5G network requirements, and especially demonstrates a relatively large effect in terms of low latency and bandwidth efficiency. As edge computing exposes the edge of a network for applications and services (including applications and services from third parties), edge computing in telecommunications networks has not only become a technical enabler to meet 5G performance indicators, but also play an important role in the transformation of the field of telecommunications. The field of telecommunications is being transformed into multi-functional service platforms for industries and other specific customer groups.

At present, 3GPP (3rd Generation Partnership Project) has proposed the concept of edge NEF (Edge Network Exposure Function) to solve the issues of time delay when 5G network parameters are exposed to an application function (AF).

However, the methods of deploying the edge NEF is relatively undiversified in existing technologies, which leads to increases in deployment and interconnection costs. For example, the existing technologies do not provide a solution for how to manage a full life cycle of the edge NEF.

In the solutions of the present disclosure, an edge computing platform can be equivalent to an edge application server. Specifically, the edge computing platform may also be an edge-enabled server that is constantly connected to the edge application server. The edge-enabled server is directly connected with a 5G core network element, and manages edge applications on the edge application server through an interface with the edge application server.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above-mentioned problems, a method, an apparatus, an electronic device, and a storage medium for network communication, which overcome the above-mentioned problems or at least partially solve the above-mentioned problems, are proposed.

A network communication method, which is applied to a first network entity, includes:

a first network entity sending a first request message to a second network entity, wherein the first request message includes at least one piece of first network parameter type information, the first request message is used to enable the second network entity to be triggered to send a first message to a third network entity according to a preset event, the first message includes at least one portion of network parameter information corresponding to the first network parameter type information; and the first network entity receiving a first reply message returned by the second network entity in response to the first request message.

In implementations, the first request message includes identification information of the third network entity.

In implementations, the first request message further includes identification information of a fourth network entity, and the identification information of the fourth network entity is used to enable the second network entity to send the first message to the third network entity according to an application corresponding to the fourth network entity.

In implementations, the second network entity includes a session management function entity, and when the second network entity is the session management function entity, the first network parameter type information includes at least one of the following:

type information of quality parameters and type information of route change parameters.

The first message includes at least one of the following:

data network access identification and routing information.

In implementations, the second network entity includes an access management function entity, and when the second network entity is the access management function entity, the first network parameter type information includes type information of a location of user equipment, and the first message includes location information of the user equipment.

In implementations, the second network entity includes a user plane functional entity, and when the second network entity is the user plane functional entity, the first network parameter type information includes at least one of the following:

type information of a delay, type information of a buffer region condition,

The first message includes at least one of the following:

round-trip delay information, buffer information.

In implementations, the second network entity includes a management service function entity, and when the second network entity is the management service function entity, the first network parameter type information includes type information of wireless network information, and the first message includes the wireless network information.

In implementations, the second network entity includes a session management function entity, and before the first network entity sends the first request message to the second network entity, the method further includes:

the first network entity receiving a second request message sent by a fourth network entity, wherein the second request message is used to request instantiating the third network entity.

In implementations, the second network entity includes a session management function entity, and before the first network entity sends the first request message to the second network entity, the method further includes:

the first network entity performing two-way authentication with the fourth network entity.

In implementations, the second network entity includes a user plane function entity, and after the first network entity sends the first request message to the second network entity, the method further includes:

the user plane function entity sending quality parameter information to a session management function entity, and the session management function entity forwarding the quality parameter information to the third network entity.

In implementations, the second network entity includes a management service function entity, and after the first network entity sends the first request message to the second network entity, the method further includes:

the management service function entity sending the first message to the fourth network entity through the third network entity.

In implementations, the second network entity includes a session management function entity, and the method further includes:

the first network entity sending a third request message to the second network entity, wherein the third request message is used to cancel an operation of reporting parameters to the fourth network entity by the second network entity through the third network entity; and the first network entity canceling an instantiation of the third network entity.

In implementations, the second network entity includes a session management function entity, sending the first request message is implemented by sending a fourth request message and a fifth request message, and the first network entity sending the first request message to the second network entity includes:

the first network entity sending the fourth request message to a fifth network entity when the second network entity is a session management function entity, to cause the fifth network entity to send the fifth request message to the second network entity according to the fourth request message.

In implementations, the method further includes:

the session management function entity sending a sixth request message to a user plane function entity, to cause the user plane function entity to send a third message to a fourth network entity through a seventh network entity, wherein the third message includes first parameter information.

In implementations, the second network entity includes a session management function entity, sending the first request message is implemented by sending a seventh request message and an eighth request message, and the first network entity sending the first request message to the second network entity includes:

when the second network entity is a session management function entity, the first network entity sends the seventh request message to a sixth network entity, to cause the sixth network entity to send the eighth request message to the second network entity.

A network communication method is applied to a second network entity. The second network entity may include a session management function entity, and the method includes:

the session management function entity receiving a first request message sent by a first network entity, and returning a first reply message for the first request message to the first network entity, wherein the first request message includes at least one piece of first network parameter type information, the first request message is used to enable the session management function entity to be triggered to send a first message to a third network entity according to a preset event, and the first message includes at least one portion of network parameter information corresponding to the first network parameter type information; and the session management function entity triggering a routing change of user equipment and sending the first message to a third network entity according to the first request message.

In implementations, the first request message includes identification information of the third network entity.

In implementations, the first request message further includes identification information of a fourth network entity, and the identification information of the fourth network entity is used to enable the second network entity to send the first message to the third network entity according to an application corresponding to the fourth network entity.

In implementations, the first network parameter type information includes at least one of the following:

type information of quality parameters and type information of route change parameters.

The first message includes at least one of the following:

data network access identification and routing information.

In implementations, the method also includes:

the session management function entity receiving quality parameter information sent by the user plane function entity; and the session management function entity forwarding a second message to the third network entity, wherein the second message includes the quality parameter information.

In implementations, the method also includes:

the session management function entity receiving a third request message sent by the first network entity, wherein the third request message is used to cancel an operation of parameter reporting by the session management function entity to the fourth network entity through the third network entity.

In implementations, receiving the first request message sent by the first network entity is implemented by receiving a fourth request message and a fifth request message, and the session management function entity receiving the first request message sent by the first network entity includes:

the session management function entity receiving a fifth request message sent by a fifth network entity, wherein the fifth request message is sent according to a fourth request message received by the fifth network entity from the first network entity.

In implementations, the method further includes:

the session management function entity sending a sixth request message to the user plane function entity, to cause the user plane function entity to send a third message to the fourth network entity through a seventh network entity, wherein the third message includes first parameter information.

In implementations, receiving the first request message sent by the first network entity is implemented by receiving a seventh request message and an eighth request message, and the session management function entity receiving the first request message sent by the first network entity includes:

the session management function entity receiving the eighth request message sent by a sixth network entity, wherein the eighth request message is sent according to the seventh request message received by the sixth network entity from the first network entity.

A network communication apparatus is applied to a first network entity, and the apparatus is used for:

sending a first request message to a second network entity, wherein the first request message includes at least one piece of first network parameter type information, the first request message is used to enable the second network entity to be triggered to send a first message to a third network entity according to a preset event, the first message includes at least one portion of network parameter information corresponding to the first network parameter type information; and receiving a first reply message returned by the second network entity in response to the first request message.

A network communication apparatus is applied to a second network entity, and the second network entity may include a session management function entity. The apparatus is used for:

the session management function entity receiving a first request message sent by a first network entity, and returning a first reply message for the first request message to the first network entity, wherein the first request message includes at least one piece of first network parameter type information, the first request message is used to enable the session management function entity to be triggered to send a first message to a third network entity according to a preset event, and the first message includes at least one portion of network parameter information corresponding to the first network parameter type information; and triggering a routing change of user equipment and sending the first message to a third network entity according to the first request message.

An electronic device includes a processor, a memory, and a computer program stored on the memory and capable of running on the processor, and the computer program is executed by the processor to implement the network communication method as described above.

A computer-readable storage medium, the computer-readable storage medium storing a computer program, and the computer program, when is executed by a processor, implements the network communication method as described above.

The embodiments of the present disclosure have the following advantages:

In the embodiments of the present disclosure, a first network entity sends a first request message to a second network entity. The first request message includes at least one piece of first network parameter type information. The first request message is used to enable the second network entity to be triggered to send a first message to a third network entity according to a preset event. The first message includes at least one portion of network parameter information corresponding to the first network parameter type information. The first network entity receives a first reply message returned by the second network entity in response to the first request message, thus implementing a dynamic management of an instantiation of the third network entity by the first network entity. Also, the first network entity can dynamically manage the authority of the third network entity to obtain network parameters, which enhances the flexibility of deployment of the first network entity.

BRIEF DESCRIPTION OF THE DRAWINGS

In order to explain the technical solutions of the present disclosure more clearly, the accompanying drawings that need to be used in the description of the present disclosure will be briefly introduced hereinafter. Apparently, the accompanying drawings described below represent only some embodiments of the present disclosure. One of ordinary skill in the art can also obtain other drawings based on these drawings without making any creative effort.

DETAILED DESCRIPTION

In order to make the above objectives, features and advantages of the present disclosure more obvious and understandable, the present disclosure will be further described in detail below in conjunction with the accompanying drawings and specific embodiments. Apparently, the described embodiments represent a part and not all of the embodiments of the present disclosure. Based on the embodiments of the present disclosure, all other embodiments obtained by one of ordinary skill in the art without making any creative effort shall fall within the scope of protection of the present disclosure.

Figure 1A:
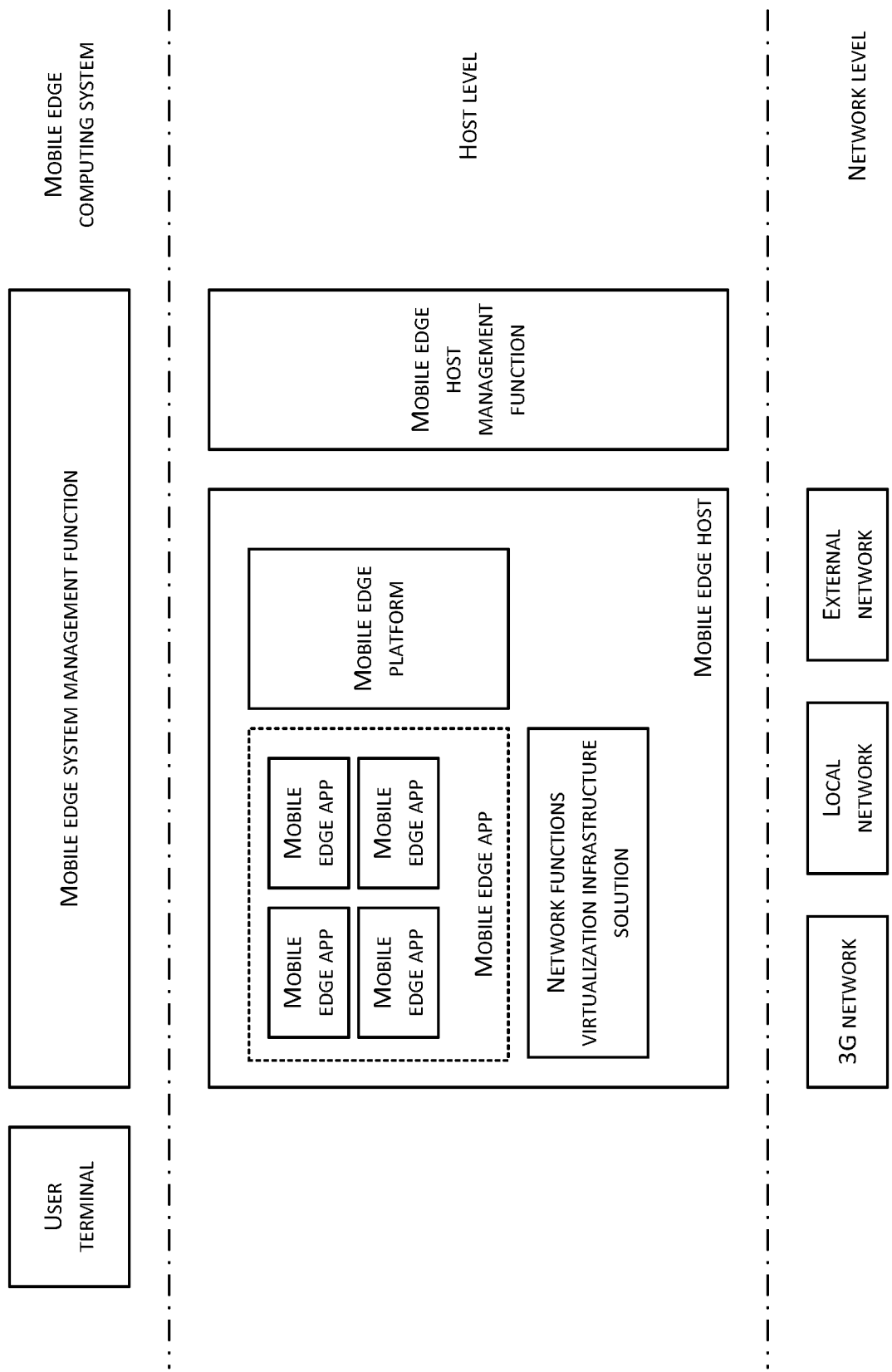
FIG. 1a is a schematic diagram of a mobile edge computing system provided by an embodiment of the present disclosure.

In a Mobile Edge Computing (MEC) system, as shown in FIG. 1a, a network level at the bottom layer may use a 3G network, a local network, and another external network. A host level in the middle may include a mobile edge host and a mobile edge host management function (mobile edge host level management). The mobile edge host may include a mobile edge platform, a virtualization architecture (Virtualization) such as a network functions virtualization infrastructure (NFVI), and a mobile edge application (Mobile edge App). A mobile edge system level 106 at the upper layer may include a mobile edge system management function (Mobile edge system level management) and user terminals, etc.

Figure 1B:
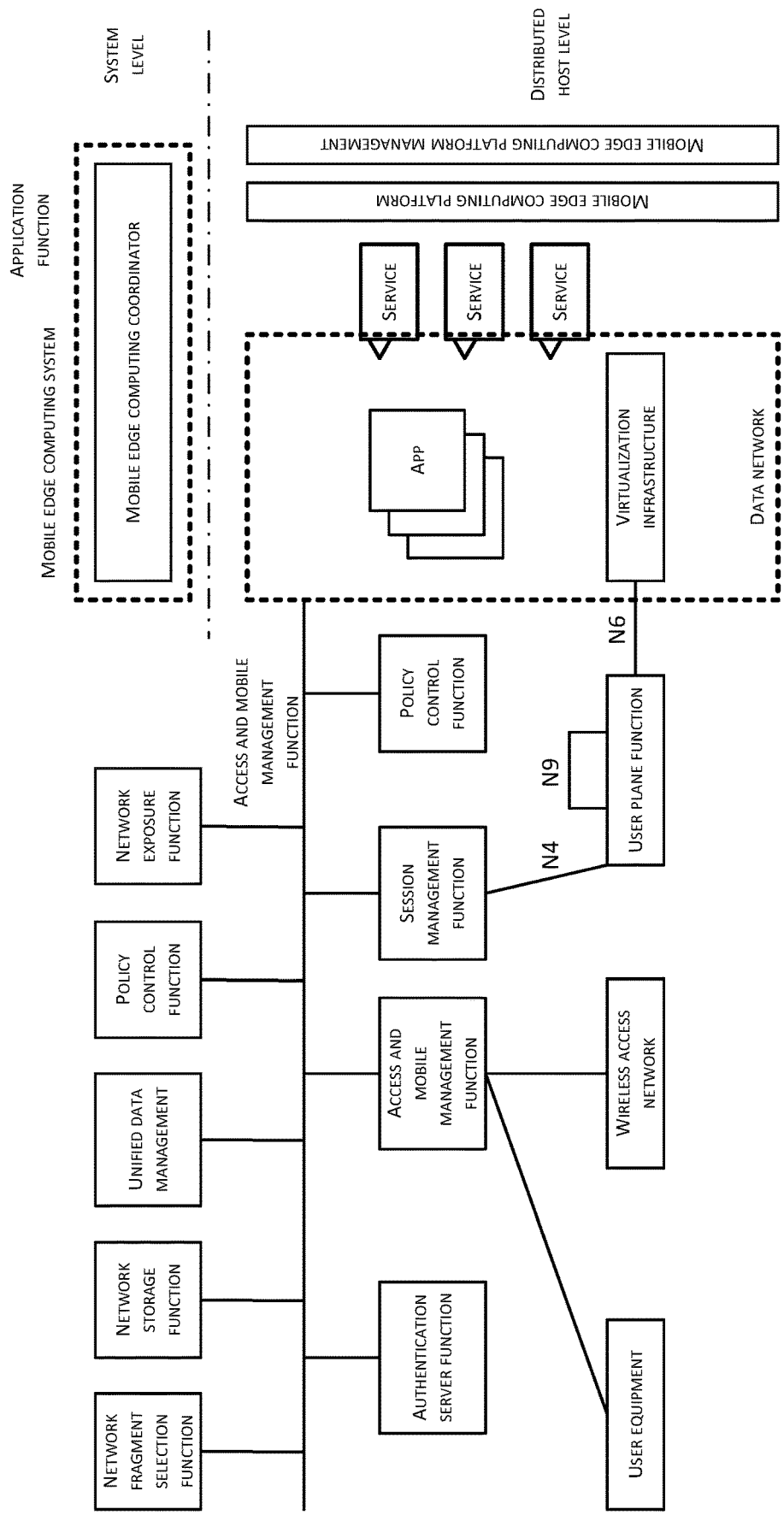
FIG. 1b is a schematic diagram of another mobile edge computing system provided by an embodiment of the present disclosure.

When a mobile edge computing system is combined with a 5G core network, as shown in FIG. 1b, the mobile edge computing system has a system level and a distributed host level. The system level may include a mobile edge computing coordinator (MEC Orchestrator), and the distributed host level may include a MEC platform, a MEC platform management, and a mobile edge host. The mobile edge host may include applications and virtualization infrastructure.

Since the mobile edge computing system is combined with the 5G core network, the instantiated mobile edge computing coordinator may be used as an application function (AF) in 5G. The mobile edge host may be used as a data network (DN) in the 5G core network. The data network is communicated and connected with a user plane function (UPF).

Specifically, the user plane function may be connected with a session management function (SMF) through a N4 interface, and may communicate with a user terminal through a radio access network (RAN). The radio access network and the user terminal may be communicated and connected with an access and mobile management function (AMF). The access and mobile management function, the session management function, a network exposure function (NEF), a policy control function (PCF), a unified data management (UDM), a network repository function (NRF), a network slice selection function (NSSF), an authentication server function (AUSF) may be communicated and connected with each other, and may access the mobile edge computing system through the access and mobile management function (AMF).

At present, 3GPP has proposed the concept of edge network exposure functions to solve the delay issues when 5G network parameters are exposed to application functions. However, in the existing technologies, the methods of deploying the edge network exposure function of are relatively undiversified, which leads to increases in deployment and connection costs. For example, the existing technologies do not provide a solution for how to manage a full life cycle of the edge network exposure function.

In the embodiments of the present disclosure, a first network entity sends a first request message to a second network entity. The first request message includes at least one piece of first network parameter type information. The first request message is used to enable the second network entity to be triggered to send a first message to a third network entity according to a preset event. The first message includes at least one portion of network parameter information corresponding to the first network parameter type information. The first network entity receives a first reply message returned by the second network entity in response to the first request message, thus implementing a dynamic management of an instantiation of the third network entity by the first network entity. Also, the first network entity can dynamically manage the authority of the third network entity to obtain network parameters, which enhances the flexibility of deployment of the first network entity.

Moreover, the instantiation of the third network entity can be dynamically managed by the first network entity, so that the third network entity can be deployed in an operator domain or an edge domain. At the same time, the first network entity can manage network elements and data types of parameters that are reported to the third network entity, thus enhancing the flexibility of deployment of the third network entity and data reporting to a fourth network entity.

The embodiments of the present disclosure are described in detail as follows.

A first network entity may be a central network exposure function (Central NEF). A second network entity may include a session management function entity, an access management function entity, a user plane function entity, and a management service function entity. The session management function entity may be a session management function (SMF). The access management function entity may be an access and mobile management function (AMF). The user plane function entity may be a user plane function (UPF). The management service function entity may be a management service function (MNS Producer, Management Service Producer). A third network entity may be an edge NEF (Edge Network Exposure Function). A fourth network entity may be an application function (AF). A fifth network entity may be a policy control function (PCF). A sixth network entity may be a unified data management (UDM). A seventh network entity may be a local network exposure function (Local NEF).

Identification information of the third network entity may be an edge network exposure function ID. Identification information of the fourth network entity may be an application function ID. Type information of a quality parameter may be type information of QoS (for example, at least one of uplink and downlink data buffering conditions, uplink and downlink delays or a round-trip delay, throughput, uplink and downlink transmission rates, etc.). Type information of a route change parameter may be type information of a user port route change (UP route change). A data network access identifier may be DNAI (Data Network Access Identifier). Routing information may be routing information of a N6 interface (N6 routing information). Type information of user equipment location may be type information of UE location. User equipment location information may be UE location information. Type information of a delay may be type information of a round trip delay. Type information of a buffer region may be type information of a buffer condition. Round trip delay information may be a round trip delay. Buffer information may be buffer condition. Type information of wireless network information may be type information of radio network information. The wireless network information may be radio network information. The quality parameter information may be QoS-related parameters (which include at least one of two-way delays of data packets, buffering status of uplink and downlink data, and uplink and downlink data delays or a round-trip delay, throughput, uplink and downlink transmission rates, etc.).

Figure 2:
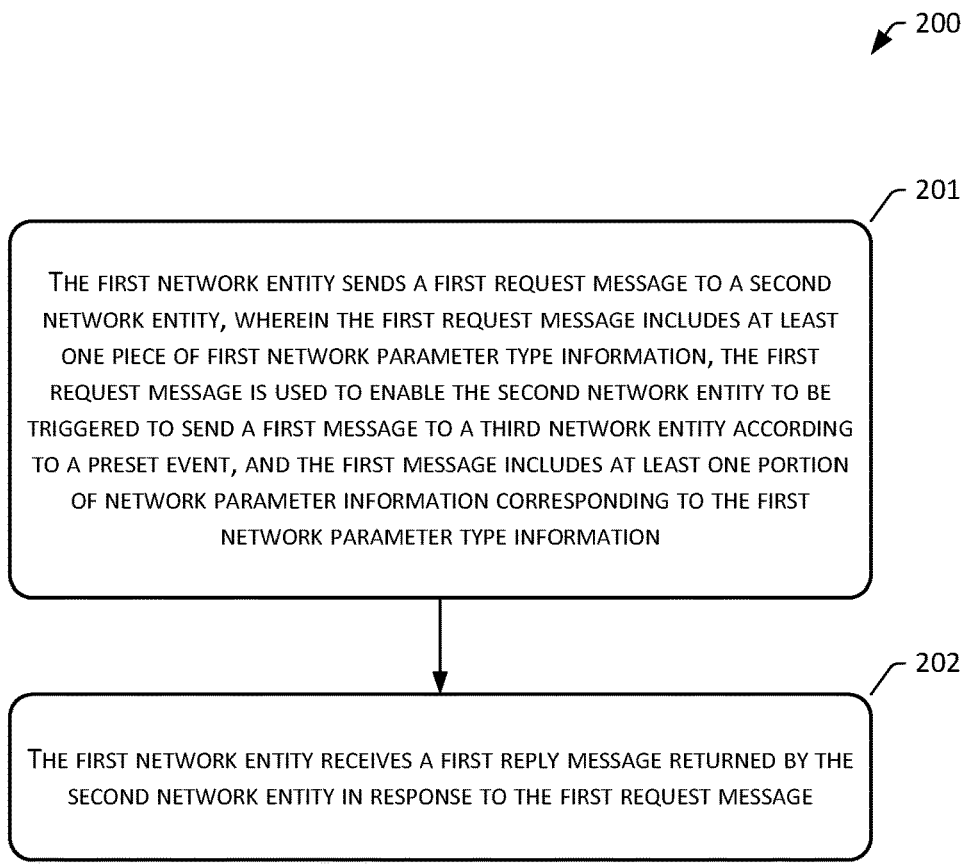
FIG. 2 is a flowchart of a network communication method according to an embodiment of the present disclosure.

FIG. 2 shows a flowchart of a network communication method 200 provided by an embodiment of the present disclosure. The method 200 can be applied in a first network entity, and specifically can include the following steps.

Step 201: The first network entity sends a first request message to a second network entity, wherein the first request message includes at least one piece of first network parameter type information, the first request message is used to enable the second network entity to be triggered to send a first message to a third network entity according to a preset event, and the first message includes at least one portion of network parameter information corresponding to the first network parameter type information.

As an example, the first request message may include identification information of the third network entity.

The first request message may further include identification information of a fourth network entity, and the identification information of the fourth network entity may be used to enable the second network entity to send the first message to the third network entity according to an application corresponding to the fourth network entity.

When a central network exposure function dynamically manages an instantiation of an edge network exposure function, the central network exposure function may send a first request message to a second network entity. The first request message may include at least one piece of first network parameter type information. The first request message may be used to trigger the second network entity to send a first message to the edge network exposure function according to a preset event. The first message includes at least one portion of network parameter information corresponding to the first network parameter type information.

In practical applications, the second network entity may include a session network entity, an access network entity, a user plane network entity, and a message service network entity. The first network parameter type information in the first request message may be different network parameter type information when the second network entity is a different network entity, and the first message sent by the second network entity to the edge network exposure function may be a different message. Also, the first message may include at least one portion of network parameter information corresponding to the first network parameter type information.

In implementations, the second network entity may include a session management function entity, and when the second network entity is a session management function entity, the first network parameter type information may include at least one of the following:

type information of quality parameters and type information of route change parameters;

The first message may include at least one of the following: a data network access identifier and routing information.

For example, the central network exposure function may send a first request message to the session management function. The first request message may be a parameter exposure enable request (Parameter exposure enable). For example, the request may be an SMF event exposure subscribe request message (Nsmf_EventExposure_Subscribe Request), or a SMF event exposure registration message (Nsmf_EventExposure_Register), which can also adopt other names with the same function.

The request message may include an edge network exposure function ID and first network parameter type information (a network parameter type). The first network parameter type information may include type information such as type information of quality parameters QoS (such as at least one of uplink and downlink data buffering conditions, uplink and downlink delays or a round-trip delay, throughput, uplink and downlink transmission rates, etc.), type information of route change parameters (UP route change), etc. Furthermore, a response message corresponding to the first request message may be received from the session management function. For example, the response message may be an SMF event exposure notification message (Nsmf_EventExposure_Notify), which can also adopt other names with the same function.

After the session management function receives the first request message, a route change to user equipment may be triggered. For example, a new user plane function may be selected, and the session management function may send the first message to the edge network exposure function. Such first message may be an SMF event exposure notification message (Nsmf_EventExposure_Notify), which may also adopt other names with the same function. The first message may include a data network access identifier DNAI, routing information (N6 routing information), etc.

In implementations, the second network entity may include an access management function entity. When the second network entity is an access management function entity, the first network parameter type information may include type information of user equipment location, and the first message may include user equipment location information.

For example, the central network exposure function may send a first request message to the access and mobile management function. The first message may be an AMF event exposure subscribe request message (Namf_EventExposure_Subscribe Request) or an AMF event exposure registration message (Namf_EventExposure_Register), which can adopt other names with the same function. Furthermore, a response message corresponding to the first request message may be received from the access and mobile management function. For example, the response message may be an AMF event exposure registration message (Namf_Location_Event_Notify), which can adopt other names with the same function.

The first request message may include an edge network exposure function ID and first network parameter type information (a network parameter type). The first network parameter type information may include type information of a location of user equipment.

After the access and mobile management function receives the first request message, the first message may be sent to the edge network exposure function, and the first message may include location information of the user equipment (UE location).

In implementations, the second network entity may include a user plane function entity. When the second network entity is a user plane function entity, the first network parameter type information may include at least one of the following:

type information of a delay, and type information of a condition of a buffer region.

The first message may include at least one of the following:

round-trip delay information, and buffer information.

For example, the central network exposure function may send a first request message to the user plane function, and the first request message may include an edge network exposure function ID and first network parameter type information (network parameter type). The first network parameter type information may include type information of a delay, type information of a condition of a buffer region, etc.

After receiving the first request message, the access and mobile management function may send the first message to the edge network exposure function, and the first message may include round trip delay information (round trip delay), buffer information (buffer condition), etc.

In an example, the network parameter information can be sent to the session management function through N4. The session management function can then send the network parameter information to the edge network exposure function using a SMF event exposure notification message (Nsmf_EventExposure_Notify), which can also adopt other names with the same function.

In implementations, the second network entity may include a management service function entity. When the second network entity is a management service function entity, the first network parameter type information may include type information of wireless network information, and the first message may include the wireless network information.

For example, the central network exposure function may send a first request message to the management service function. The first request message may be a parameter exposure enable request. For example, the request may be an MNF event exposure subscribe request message (Nmnf_EventExposure_Subscribe Request), or a MNF event exposure registration message (Nmnf_EventExposure_Register), which can also adopt other names with the same function. A response message corresponding to the first request message may be received from the management service function. For example, the response message may be a MNF event exposure notification message (Nmnf_EventExposure_Notify), which can also adopt other names with the same function.

The request message may include an edge network exposure function ID and first network parameter type information (network parameter type). The first network parameter type information may include type information of wireless network information (radio network information). A first reply message for the first request message may be received from the management service function.

After receiving the first request message, the management service function may send a first message to the edge network exposure function. The first message may include wireless network information. In other words, the wireless network information may be directly sent to the edge network exposure function, and then the edge network exposure function may directly send relevant parameter information to an application function.

Step 202: The first network entity receives a first reply message returned by the second network entity in response to the first request message.

In implementations, the second network entity may include a session management function entity. Before the first network entity sends the first request message to the second network entity, the method further includes:

the first network entity receiving a second request message sent by a fourth network entity, wherein the second request message is used to request an instantiation of a third network entity.

The second request message may be a request for instantiating the third network entity sent by the fourth network entity to the first network entity.

In practical applications, the fourth network entity may send a second request message of the third network entity to the first network entity. The second request message may be an instantiation request. The instantiation request may be performed by calling a request interface for instantiating the third network entity in a CAPIF interface of a network exposure function, thereby instantiating the third network entity. For example, the central network exposure function can instantiate an edge network exposure function in an operator domain or an edge domain. Other technical methods can also be used to achieve the purpose of instantiation.

Figure 3A:
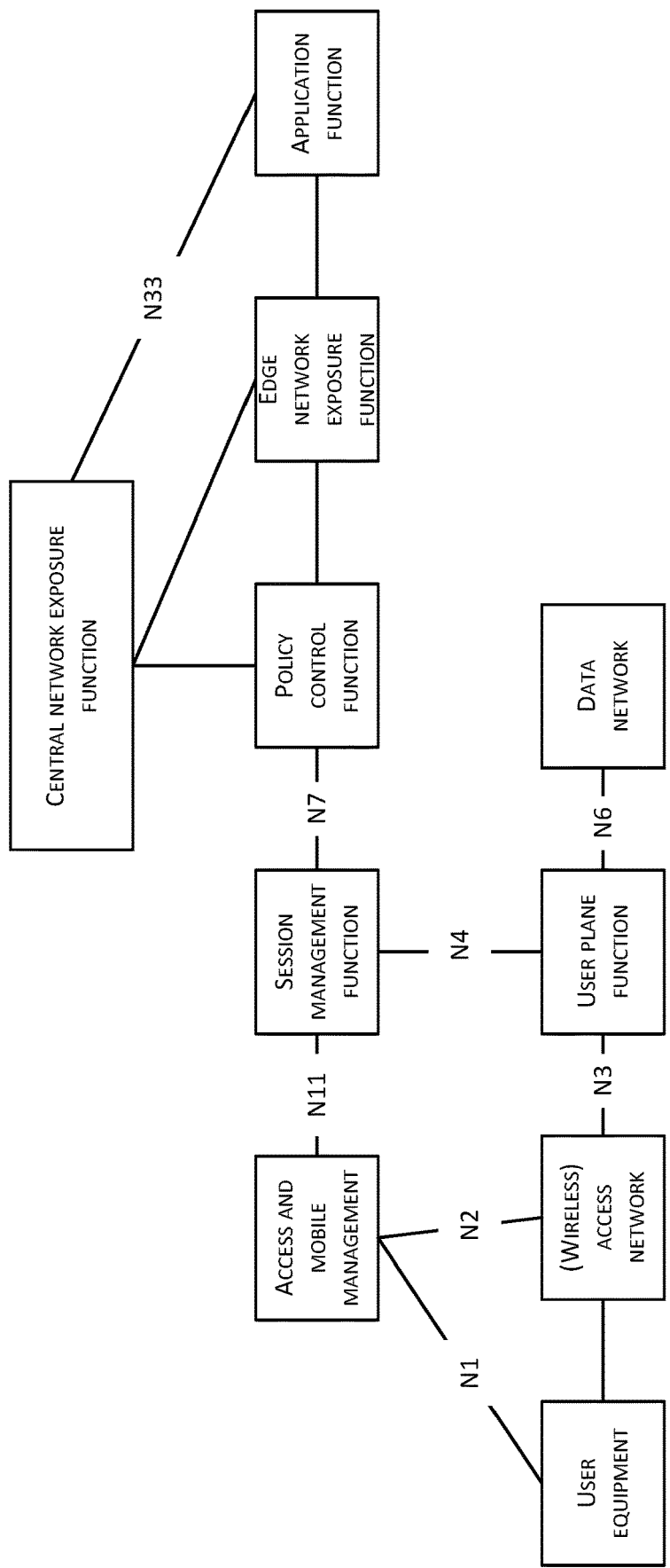
FIG. 3a is a schematic diagram of an instantiation in an operator domain according to an embodiment of the present disclosure.

In an example, as shown in FIG. 3*a*, a central network exposure function may instantiate an edge network exposure function in an operator domain, and can authorize the edge network exposure function to receive network parameters of a wireless access network side and a 5G core network side through dynamic management. The operator domain can refer to the 5G core network and UPF-related servers or server clusters. An interface from the edge network exposure function to a core network element (such as a policy control function, etc.), and an interface from the edge network exposure function to an application function, can reuse original interfaces from the central network exposure function to the core network element, and the edge network exposure function to the application function. The edge network exposure function can be instantiated on the UPF or on an operator domain server that is near the UPF.

Figure 3B:
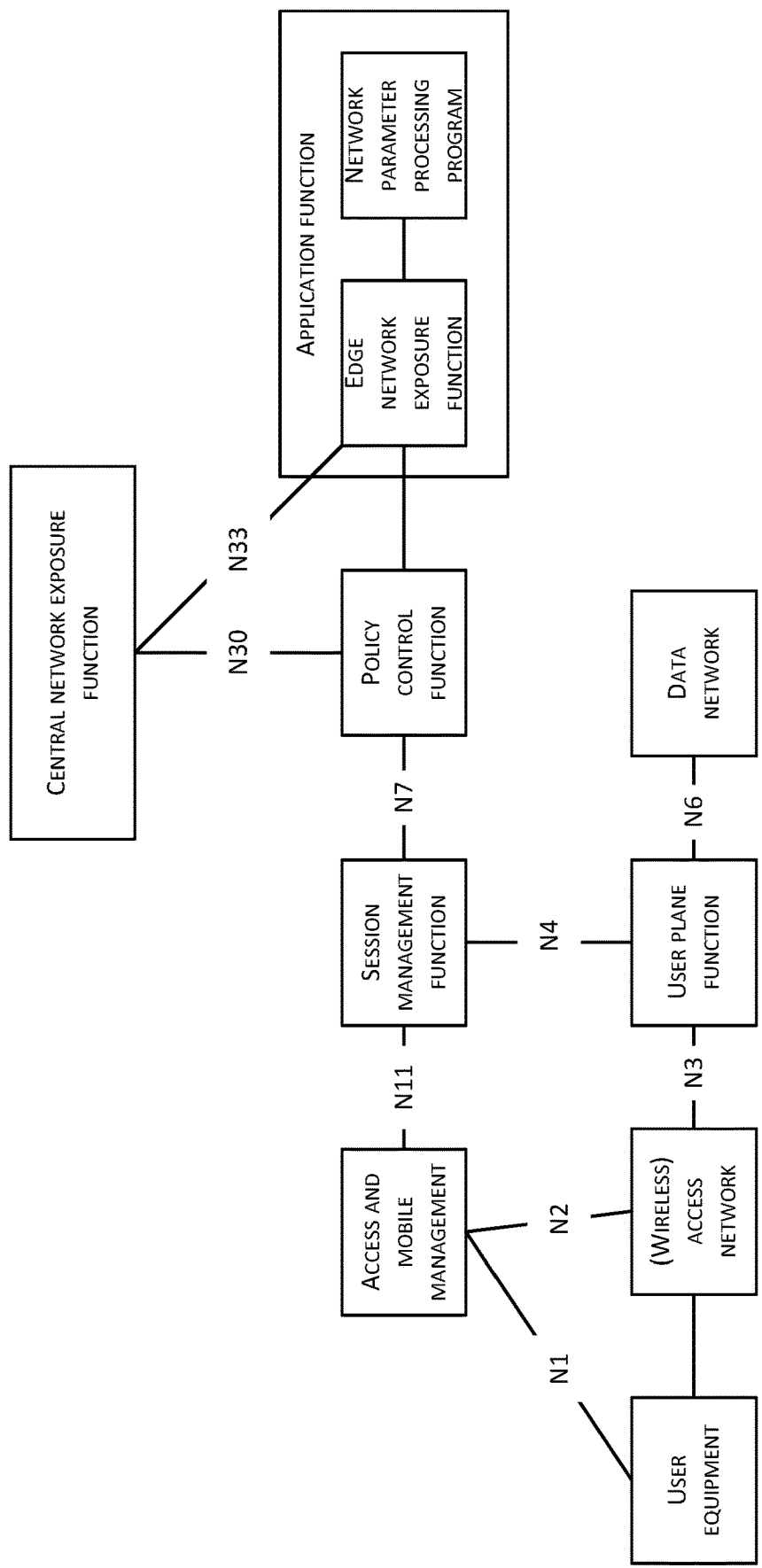
FIG. 3b is a schematic diagram of an instantiation in an edge domain provided by an embodiment of the present disclosure.

In another example, as shown in FIG. 3*b*, a central network exposure function can instantiate an edge network exposure function in an edge domain, and can authorize the edge network exposure function to receive network parameters of a wireless access network side and a 5G core network side through dynamic management. The edge domain can specifically refer to an edge computing server deployed by a third party, which can include DN and AF. An interface from the edge network exposure function to a core network element (such as a policy control function, etc.), and an interface from the edge network exposure function to an application function, can reuse original interfaces from the central network exposure function to the core network element, and the edge network exposure function to the application function.

By using the central network exposure function to instantiate the edge network exposure function, the edge network exposure function can be instantiated in an operator domain and act as a network element function entity (NF) of a 5G core network, or can also be instantiated in an application function. As such, the (central) network exposure function can support a dynamic instantiation of an edge network exposure function in an operator domain or an edge domain. Moreover, the central network exposure function can dynamically manage the authority of the edge network exposure function to obtain network parameters.

In implementations, the second network entity may include a session management function entity. Before the first network entity sends the first request message to the second network entity, the method further includes:

the first network entity performing a two-way authentication with the fourth network entity.

After the first network entity receives the second request message sent by the fourth network entity, the first network entity can perform a two-way authentication with the fourth network entity. For example, after the central network exposure function receives the second request message sent by the application function, the central network exposure function can perform a two-way authentication with the application function.

In implementations, the second network entity may include a user plane function entity. After the first network entity sends the first request message to the second network entity, the method further includes:

the user plane function entity sending quality parameter information to the session management function entity, which forwards the quality parameter information to the third network entity.

In practical applications, the user plane function can send information of quality parameters to the session management function, and the session management function can forward the information of quality parameters to the edge network exposure function. For example, the application function can send QoS parameter monitoring (QoS monitoring) request to the user plane function through the policy control function and the session management function. After receiving the QoS parameter monitoring request, the user plane function can send the information of quality parameters, i.e., QoS related parameters (which include at least one of two-way delays of data packets, uplink and downlink data buffering conditions, uplink and downlink delays or a round-trip delay, throughput, uplink and downlink transmission rates, etc.), to the session management function using a message (such as a N4 report message) through a N4 interface.

In implementations, the second network entity may include a management service function entity. After the first network entity sends the first request message to the second network entity, the method further includes:

the management service function entity sending the first message to the fourth network entity through the third network entity.

In practical applications, the management service function may directly send the wireless network information to the edge network exposure function after receiving the first request message, and thereby the edge network exposure function may directly send relevant parameter information to the application function.

In implementations, the second network entity may include a session management function entity, and the method further includes:

the first network entity sending a third request message to the second network entity, wherein the third request message is used to cancel an operation of reporting parameters by the second network entity to the fourth network entity through the third network entity; and the first network entity canceling the instantiation of the third network entity.

In implementations, the first network entity may send a third request message to the session management function entity. The third request message may be used to cancel an operation of the session management function entity for reporting parameters to the fourth network entity through the third network entity, and thereby the central network exposure function can cancel the instantiation of the third network entity.

Specifically, the central network exposure function may send a third request message to the session management function. The third request message may be a parameter disable request, or an event exposure subscription request (EventExposure_subscribe), or an event exposure unsubscribe request (EventExposure_unsubscribe), which includes an instruction of canceling a direct transmission of network parameters to the edge NEF. Other names with the same function can also be adopted. The request can be used to cancel the operation of the session management function to directly report the parameters to the application function through the edge network exposure function. Furthermore, the central network exposure function can configure and cancel instantiation of the edge network exposure function.

In the embodiments of the present disclosure, a first network entity sends a first request message to a second network entity. The first request message includes at least one piece of first network parameter type information. The first request message is used to enable the second network entity to be triggered to send a first message to a third network entity according to a preset event. The first message includes at least one portion of network parameter information corresponding to the first network parameter type information. The first network entity receives a first reply message returned by the second network entity in response to the first request message, thus implementing a dynamic management of an instantiation of the third network entity by the first network entity. Also, the first network entity can dynamically manage the authority of the third network entity to obtain network parameters, which enhances the flexibility of deployment of the first network entity.

Figure 4:
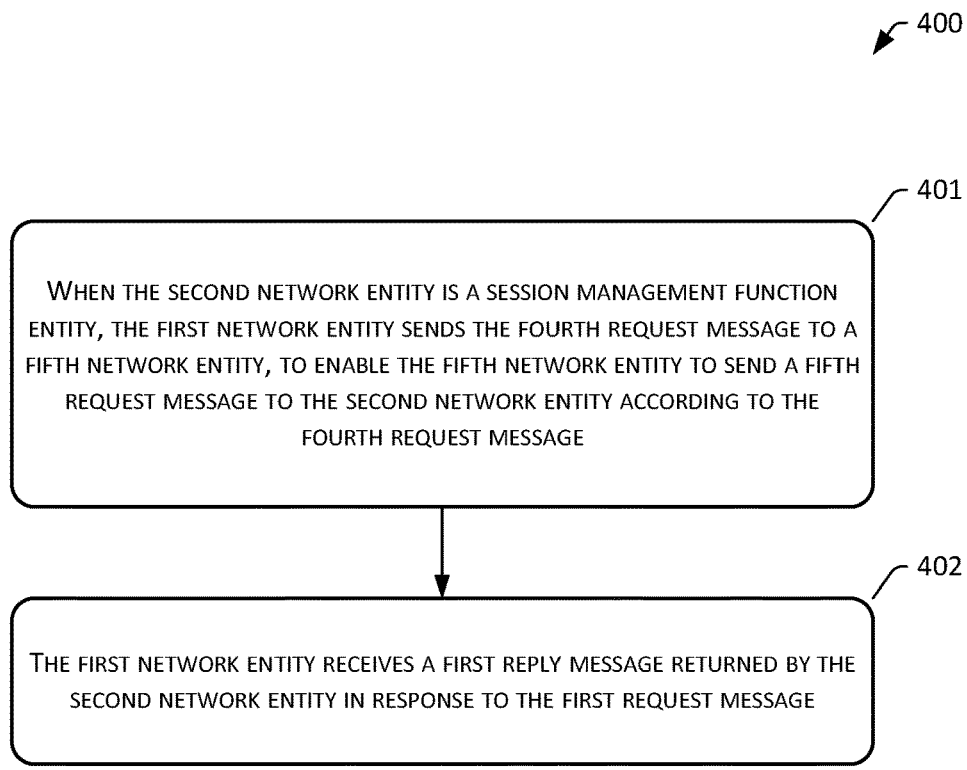
FIG. 4 is a flowchart of another network communication method according to an embodiment of the present disclosure.

FIG. 4 shows a flowchart of another network communication method 400 provided by an embodiment of the present disclosure. The method 400 can be applied to the side of a first network entity, and a second network entity may include a session management function entity. A process of sending a first request message can be realized by sending a fourth request message and a fifth request message, and specifically can include the following steps:

Step 401: When the second network entity is a session management function entity, the first network entity sends the fourth request message to a fifth network entity, to enable the fifth network entity to send a fifth request message to the second network entity according to the fourth request message.

In a process of dynamic managing an instantiation of an edge network exposure function by a central network exposure function, when the second network entity is a session management function entity, the central network exposure function may send a fourth request message to a fifth network entity, so that the fifth network entity may send a fifth request message to the second network entity according to the fourth request message.

In an example, by sending the fourth request message and the fifth request message, sending the first request message from the first network entity to the second network entity can be achieved. In other words, parameter information in the first request message can be obtained through the fourth request message and the fifth request message.

Figure 5:
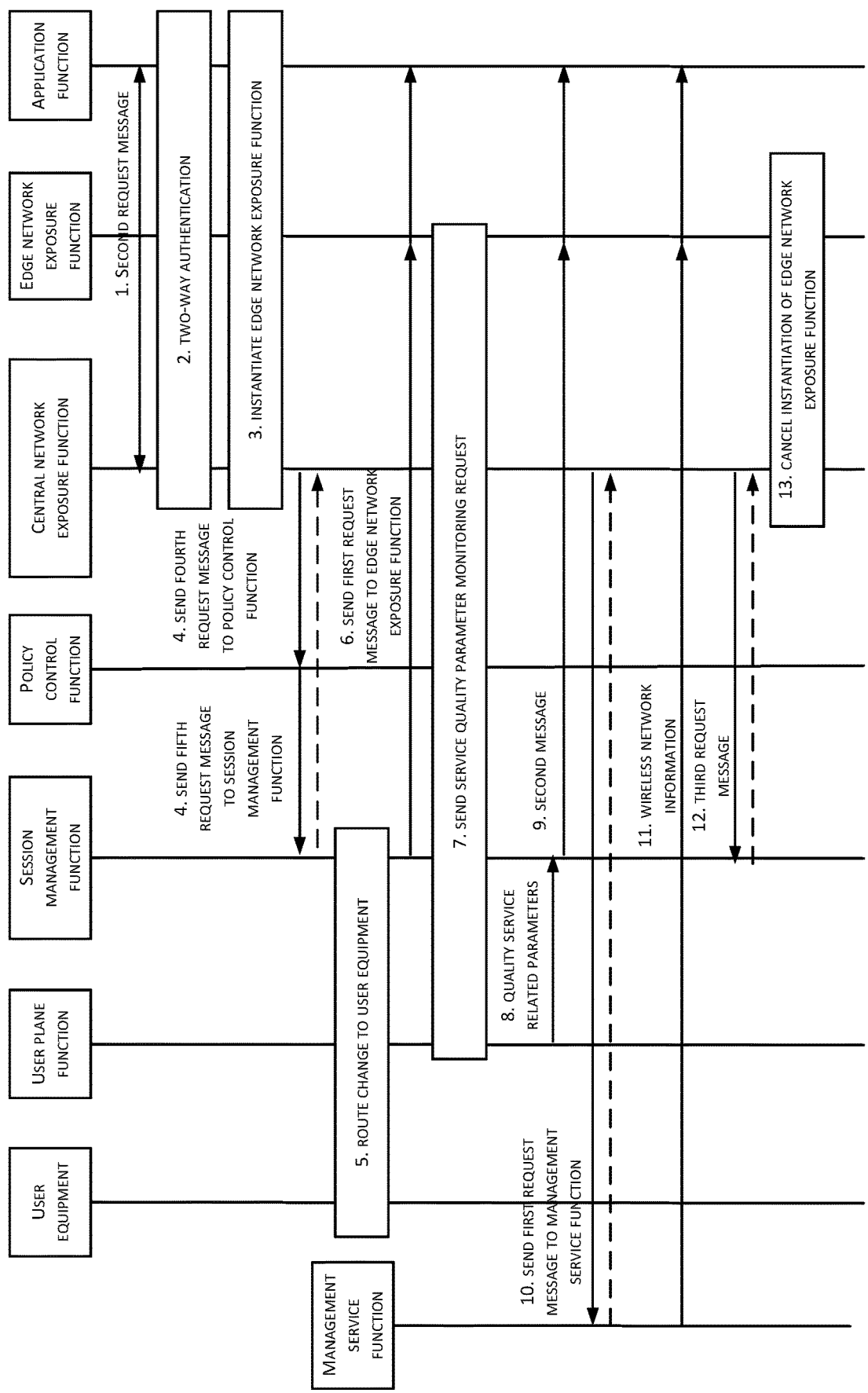
FIG. 5 is a schematic diagram of an example of network communication provided by an embodiment of the present disclosure.

For example, as shown in FIG. 5, a central network exposure function may send a fourth request message to a fifth network entity. The fourth request message may be a PCF policy authentication subscribe request message (Npcf_PolicyAuthorization_Subscribe Request), or a PCF policy authentication. create or update request message (Npcf_PolicyAuthorization_Create/Update Request), which can also adopt other names with the same function. The request message may include an edge network exposure function ID and in implementations, first network parameter type information (network parameter type). The first network parameter type information may also be an event ID, and the first network parameter type information may include type information, such as type information of quality parameters QoS (such as at least one of uplink and downlink data buffering conditions, uplink and downlink delays or a round-trip delay, throughput, uplink and downlink transmission rates, etc.), type information of a route change parameter (UP route change), etc. In implementations, the fourth request message may not include network parameter type information. When no relevant network parameter type information is indicated, a 5G core network element (such as SMF or AMF) can notify an AF of designated default parameters or all parameters through a local NEF. In addition, the central network exposure function may receive a related reply message sent by the fifth network entity for the fourth request message. In implementations, the fourth request message may further include an AF identifier and a local event notification identifier. The fifth network entity may indicate, through the local event notification identifier, a corresponding 5G core network element (for example, SMF or AMF) to notify specified types of network parameters to a specified AF through the edge network exposure function.

After the fifth network entity receives the fourth request message sent by the central network exposure function, the fifth network entity may send a fifth request message to the session management function entity according to the fourth request message. The fifth request message may be an SMF event exposure subscribe request message (Nsmf_EventExposure_Subscribe Request) or a PCF session management policy control update notification request message (Npcf_SMPolicyControl_UpdateNotify Request), which can also adopt other names with the same function. The request message may include an edge network exposure function ID and first network parameter type information (network parameter type). The first network parameter type information may include type information such as type information of quality parameters QoS (such as at least one of uplink and downlink data buffering conditions, uplink and downlink delays or a round-trip delay, throughput, uplink and downlink transmission rates, etc.), type information of a route change parameter (UP route change). In addition, the fifth network entity may receive a related reply message sent by the session management function entity for the fifth request message. PCF will use a local-time notification as a part of a policy and charging control rule (PCC rule), which is used to indicate a corresponding UPF through SMF to notify specify AF of QoS related parameters (such as at least one of uplink and downlink data buffering conditions, uplink and downlink delays or a round-trip delay, throughput, uplink and downlink transmission rates, etc.) via a local NEF.

In an example, if an unsubscribe request message (unsubscribe) is sent, it can also be performed through a similar process. For example, a request message can be sent to the policy control function through the central network exposure function, and the request message can be a PCF policy authentication unsubscribe request message (Npcf_PolicyAuthorization_Unsubscribe Request), or a PCF policy authentication create or update request message (Npcf_PolicyAuthorization_Create/Update Request), which can also adopt other names with the same function. The request message may include an edge network exposure function ID and in implementations, first network parameter type information (network parameter type). The first network parameter type information may also be an event ID. The first network parameter type information may include type information, such as type information of quality parameters QoS (such as at least one of uplink and downlink data buffering conditions, uplink and downlink delays or a round-trip delay, throughput, uplink and downlink transmission rates, etc.), type information of a route change parameter (UP route change). In implementations, the request message may not include network parameter type information. When no relevant network parameter type information is indicated, a 5G core network element (such as SMF or AMF) can notify an AF of designated default parameters or all parameters through a local NEF. In addition, the central network exposure function may receive a related reply message sent by the policy control function for the fourth request message. In implementations, the request message may further include an AF identifier and a local event notification identifier. The policy control function may indicate, through the local event notification identifier, a corresponding 5G core network element (for example, SMF or AMF) to notify specified types of network parameters to a specified AF through the edge network exposure function.

After the policy control function receives the request message sent by the central network exposure function, the policy control function may send a request message to the session management function entity according to the request message. The request message may be an SMF event exposure subscribe request message (Nsmf_EventExposure_Subscribe Request) or a PCF session management policy control update notification request message (Npcf_SMPolicyControl_UpdateNotify Request), which can also adopt other names with the same functions. The request message may include an edge network exposure function ID and first network parameter type information (network parameter type). The first network parameter type information may include type information, such as type information of quality parameters QoS (such as at least one of uplink and downlink data buffering conditions, uplink and downlink delays or a round-trip delay, throughput, uplink and downlink transmission rates, etc.), type information of a route change parameter (UP route change). In addition, the policy control function may receive a related reply message for the request message from the session management function entity. The PCF can remove a local-time notification from a policy and charging control rule (PCC rule). In this case, the UPF cannot notify the AF of relevant parameters through the local NEF.

In implementations, the method may further include the following step:

the session management function entity sending a sixth request message to a user plane function entity, to cause the user plane function entity to send a third message to the fourth network entity through a seventh network entity, wherein the third message includes first parameter information.

As an example, the first parameter information may be at least one of uplink and downlink data buffering conditions, uplink and downlink delays or a round-trip delay, throughput, and uplink and downlink transmission rates.

In practical applications, the session management function entity may send a sixth request message to a user plane function entity, so that the user plane function entity may send a third message to an application function through a local network exposure function. The third message may include at least one of uplink and downlink data buffering conditions, uplink and downlink delays or a round-trip delay, throughput, uplink and downlink transmission rates, etc.

In an example, if the session management function entity is far away from the edge domain or the local network exposure function, the session management function entity can send a request message to the user plane function entity through a N4 report interface, so that the user plane function entity can send the QoS parameters to the application function through the local network exposure function.

Step 402: The first network entity receives a first reply message returned by the second network entity in response to the first request message.

Figure 6:
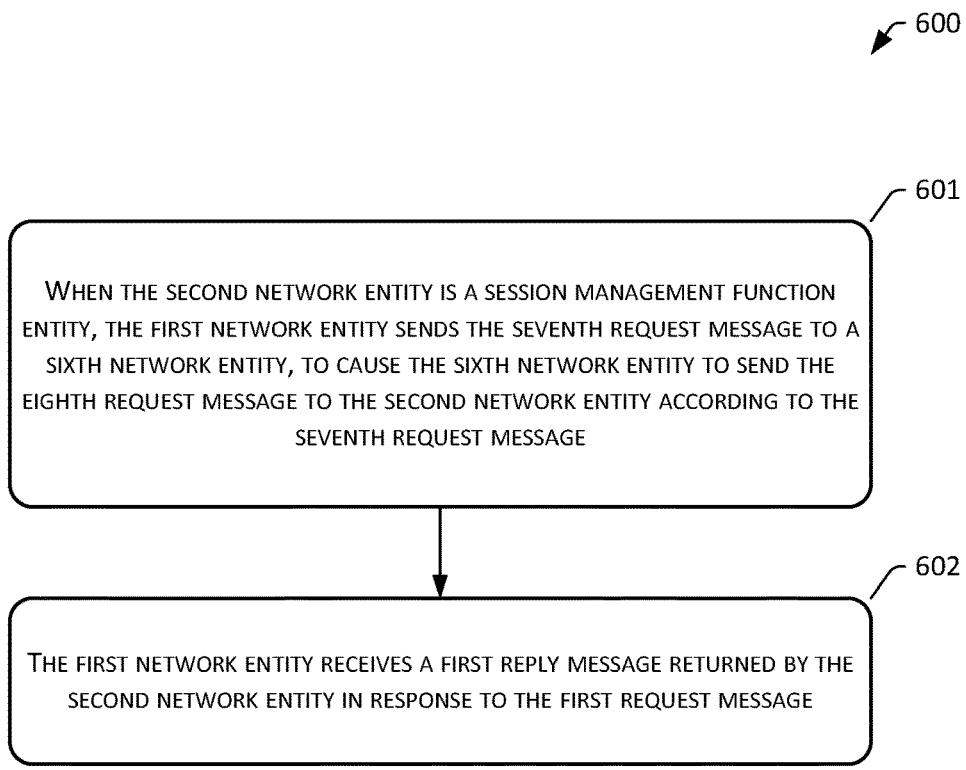
FIG. 6 is a flowchart of another network communication method according to an embodiment of the present disclosure.

FIG. 6 shows a flowchart of another network communication method 600 provided by an embodiment of the present disclosure. The method 600 may be applied to the side of a first network entity. A second network entity may include a session management function entity. A process of sending a first request message can be realized by sending a seventh request message and an eighth request message, and specifically can include the following steps:

Step 601: When the second network entity is a session management function entity, the first network entity sends the seventh request message to a sixth network entity, to cause the sixth network entity to send the eighth request message to the second network entity according to the seventh request message.

In a process of dynamic managing an instantiation of an edge network exposure function by a central network exposure function, when the second network entity is a session management function entity, the central network exposure function may send a seventh request message to a sixth network entity, so that the sixth network entity may send an eighth request message to the second network entity according to the seventh request message.

In an example, by sending the seventh request message and the eighth request message, sending the first request message from the first network entity to the second network entity can be achieved. In other words, parameter information in the first request message can be obtained through the seventh request message and the eighth request message.

Figure 7:
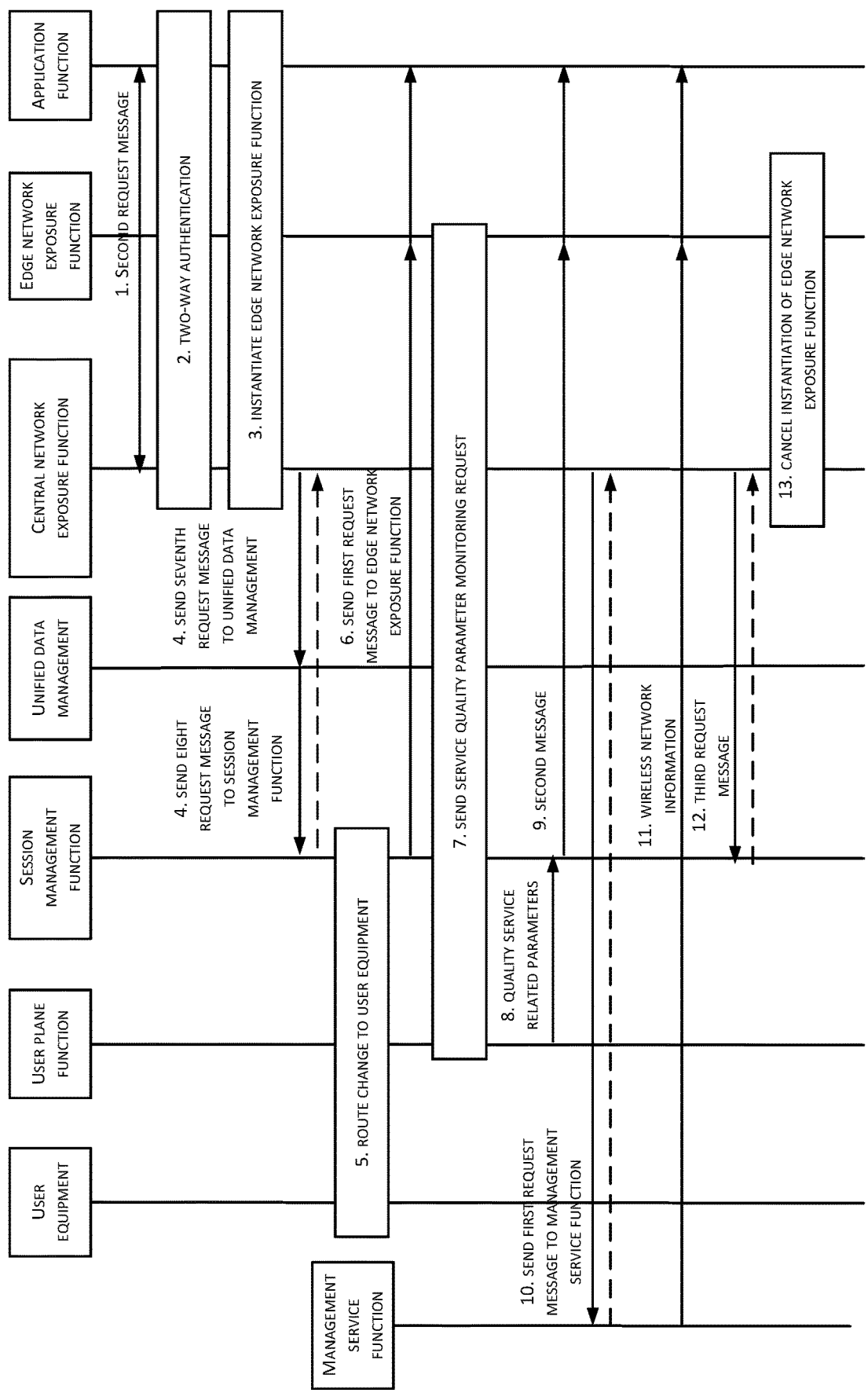
FIG. 7 is a schematic diagram of another example of network communication provided by an embodiment of the present disclosure.

For example, as shown in FIG. 7, the central network exposure function can send a seventh request message to the sixth network entity. The seventh request message can be a UDM event exposure subscribe request message (Nudm_EventExposure_Subscribe Request), which can also adopt other names with the same function. The request message may include an edge network exposure function ID and first network parameter type information (network parameter type). The first network parameter type information may also be an event ID, and the first network parameter type information may include type information, such as type information of quality parameters QoS (such as at least one of uplink and downlink data buffering conditions, uplink and downlink delays or a round-trip delay, throughput, uplink and downlink transmission rates, etc.), type information of a route change parameter (UP route change), etc. In implementations, the seventh request message may not include network parameter type information. When no relevant network parameter type information is indicated, a 5G core network element (such as SMF or AMF) can notify an AF of designated default parameters or all parameters through a local NEF. In addition, the central network exposure function may receive a related reply message sent by the sixth network entity for the seventh request message. In implementations, the seventh request message may further include an AF identifier and a local event notification identifier. The sixth network entity may indicate, through the local event notification identifier, a corresponding 5G core network element (for example, SMF or AMF) to notify specified types of network parameters to a specified AF through the edge network exposure function.

After the sixth network entity receives the seventh request message sent by the central network exposure function, the sixth network entity may send an eighth request message to the session management function entity according to the seventh request message. The eighth request message may be an SMF event exposure subscribe request message (Nsmf_EventExposure_Subscribe Request). The request message may include an edge network exposure function ID and first network parameter type information (network parameter type). The first network parameter type information may include type information such as type information of quality parameters QoS (such as at least one of uplink and downlink data buffering conditions, uplink and downlink delays or a round-trip delay, throughput, uplink and downlink transmission rates, etc.), type information of a route change parameter (UP route change). In addition, the sixth network entity may receive a related reply message sent by the session management function entity for the eighth request message.

Step 602: The first network entity receives a first reply message returned by the second network entity in response to the first request message.

Figure 8:
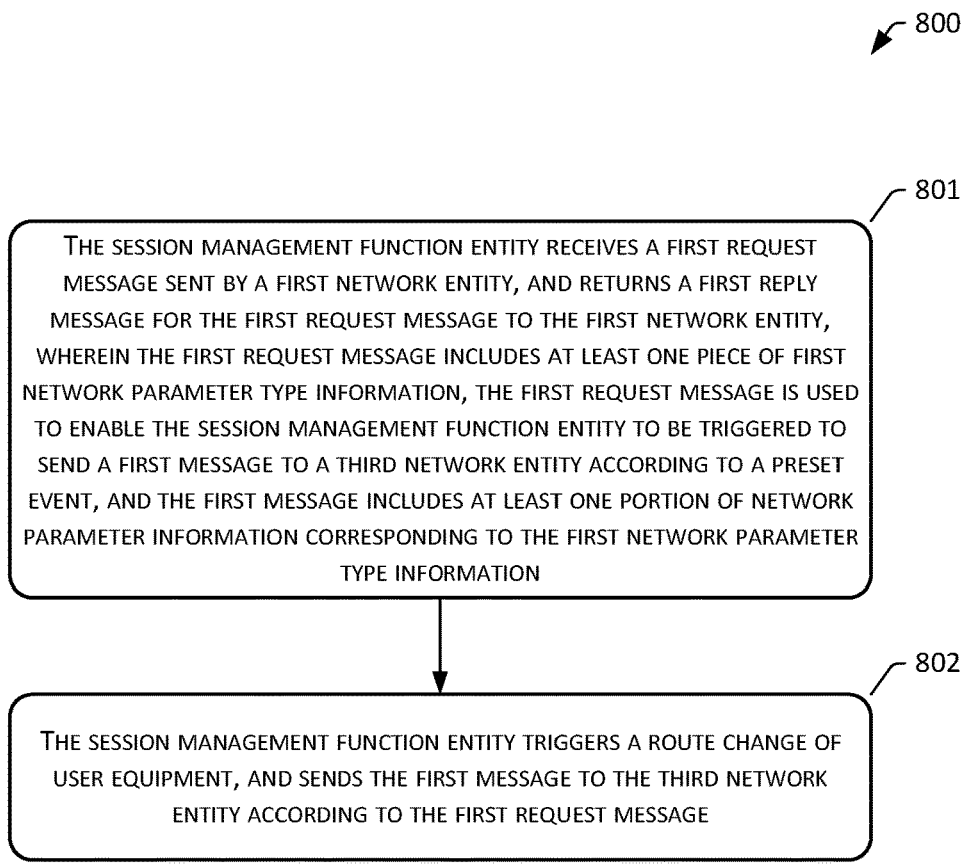
FIG. 8 is a flowchart of another network communication method provided by an embodiment of the present disclosure.

FIG. 8 shows a flowchart of a network communication method 800 provided by an embodiment of the present disclosure. The method 800 may be applied to a second network entity, and the second network entity may include a session management function entity. The method may specifically include the following steps:

Step 801: The session management function entity receives a first request message sent by a first network entity, and returns a first reply message for the first request message to the first network entity, wherein the first request message includes at least one piece of first network parameter type information, the first request message is used to enable the session management function entity to be triggered to send a first message to a third network entity according to a preset event, and the first message includes at least one portion of network parameter information corresponding to the first network parameter type information.

As an example, the first request message may include identification information of the third network entity.

The first request message may further include identification information of a fourth network entity, and the identification information of the fourth network entity may be used to enable the second network entity to send the first message to the third network entity according to an application corresponding to the fourth network entity.

The first network parameter type information may include at least one of the following:

type information of quality parameters and type information of route change parameters;

The first message may include at least one of the following:

data network access identification and routing information.

When a central network exposure function dynamically manages an instantiation of an edge network exposure function, the central network exposure function may send a first request message to the session management function. The first request message may be a parameter exposure enable request (Parameter exposure enable). For example, the request message may be an SMF event exposure subscribe request message (Nsmf_EventExposure_Subscribe Request), or a SMF event exposure registration message (Nsmf_EventExposure_Register), which can also adopt other names with the same function.

The request message may include an edge network exposure function ID and first network parameter type information (a network parameter type). The first network parameter type information may include type information such as type information of quality parameters QoS (such as at least one of uplink and downlink data buffering conditions, uplink and downlink delays or a round-trip delay, throughput, uplink and downlink transmission rates, etc.), type information of route change parameters (UP route change), etc. Furthermore, a response message corresponding to the first request message may be received from the session management function. For example, the response message may be an SMF event exposure notification message (Nsmf_EventExposure_Notify), which can also adopt other names with the same function.

Step 802: The session management function entity triggers a route change of user equipment, and sends the first message to the third network entity according to the first request message.

After receiving the first request message, the session management function can trigger a route change to the user equipment. For example, a new user plane function can be selected, and the session management function can send the first message to the edge network exposure function. The message may be an SMF event exposure notification message (Nsmf_EventExposure_notify), which may also adopt other names with the same function. The first message may include a data network access identifier (DNA)I, routing information (N6 routing information), etc.

In implementations, the method further includes:
the session management function entity receiving quality parameter information sent by the user plane function entity; the session management function entity forwarding a second message to the third network entity, wherein the second message includes the quality parameter information.

In practical applications, the session management function may receive quality parameter information sent by the user plane function, and the session management function may then forward the second message to the edge network exposure function, wherein the second message may include the quality parameter information.

For example, an application function may send a QoS parameter monitoring (QoS monitoring) request to a user plane function through a policy control function and a session management function. After receiving the QoS parameter monitoring request, the user plane function may then send information of quality parameters, i.e., QoS related parameters (which include two-way delays of data packets, and may also include at least one of uplink and downlink data buffering conditions, uplink and downlink delays or round-trip delays, throughput, and uplink and downlink transmission rates, etc.), the session management function through a N4 interface. The session management function can then report the QoS related parameters to an edge network exposure function by sending a second message. The second message can be an SMF event exposure notification message (Nsmf_EventExposure_notify), which can also adopt other names with the same function. An edge NEF can send information of the QoS-related parameters to the application function.

In implementations, the method further includes:
the session management function entity receiving a third request message sent by the first network entity, wherein the third request message is used to cancel an operation of reporting parameters to the fourth network entity by the session management function entity through the third network entity.

In a process of dynamically managing an instantiation of the third network entity by the first network entity, the session management function entity may receive a third request message sent by the first network entity. The third request message may be used to cancel an operation of the session management function entity that reports parameters to the fourth network entity through the third network entity, so that the first network entity can cancel the instantiation of the third network entity.

Specifically, the central network exposure function may send a third request message to the session management function. The third request message may be a parameter disable request (Parameter disable request), or an event exposure subscription request (EventExposure_subscribe), or an event exposure unsubscribe request EventExposure_unsubscribe), which includes instruction information that cancels a direct transmission of network parameters to the edge NEF. Other names can also be adopted, but functions thereof are the same. It can be used to cancel an operation of directly reporting the parameters by the session management function to the application function through the edge network exposure function. Furthermore, the central network exposure function can set and cancel instantiations of the edge network exposure function.

Figure 9:
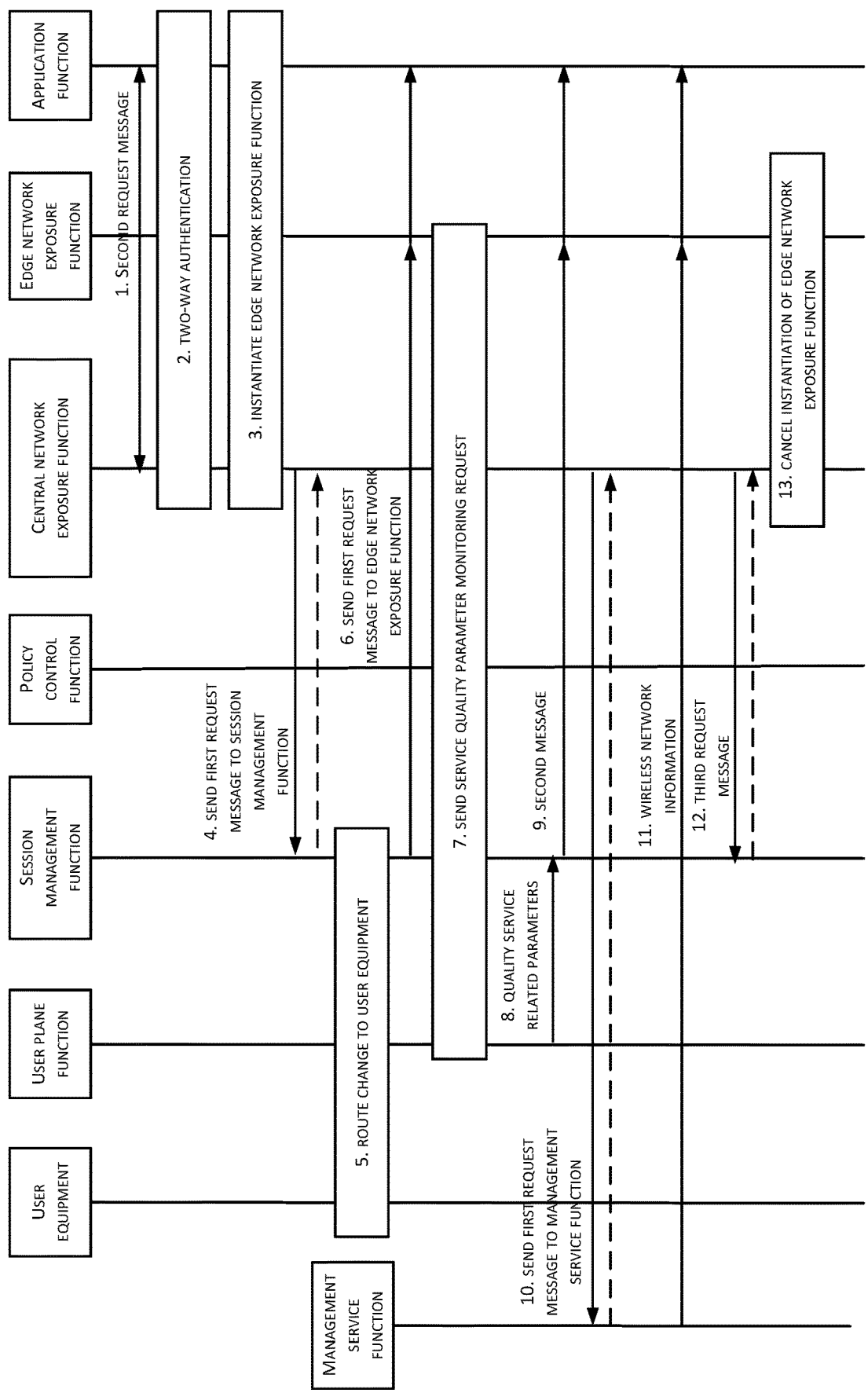
FIG. 9 is a schematic diagram of another example of network communication provided by an embodiment of the present disclosure.

The embodiments of the present disclosure will be exemplarily described below in conjunction with FIG. 9:

1. An application function may send a second request message of an edge network exposure function to a central network exposure function. The second request message may be an instantiation request. The instantiation request may be implemented by calling a request interface for instantiating the edge network exposure function in a network exposure function CAPIF interface.

2. The application function may perform two-way authentication with the central network exposure function.

3. The central network exposure function may instantiate the edge network exposure function. The edge network exposure function may be instantiated in an operator domain, and act as a network element function entity (NF) of a 5G core network, or may also be instantiated in an application function.

4. The central network exposure function may send a first request message to a session management function. For example, the first request message may be a parameter exposure enable (Parameter exposure enable), which can also adopt other names with the same functions. The request message can include an edge network exposure function ID and first network parameter type information (network parameter type). The first network parameter type information may include type information, such as type information of quality parameters QoS (for example, at least one of uplink and downlink data buffering conditions, uplink and downlink delays or a round-trip delay, throughput, uplink and downlink transmission rates, etc.), type information of a route change parameter (UP route change). The central network exposure function may receive a first reply message sent by the session management function for the first request message.

5. After receiving the first request message, the session management function may trigger a route change to user equipment. For example, a new user plane function may be selected;

6. The session management function may send a first message to the edge network exposure function. For example, the first message may be an SMF event exposure notification message (Nsmf_EventExposure_notify), which can also adopt other names, but their functions are the same. The first message may include a data network access identifier (DNAI), routing information (N6 routing information), etc.

7. The application function may send a QoS parameter monitoring (QoS monitoring) request to a user plane function through a policy control function and a session management function.

8. After receiving the QoS monitoring request, the user plane function may send information of quality parameters, i.e., QoS related parameters (which include two-way delays of data packets, and may also include at least one of the of uplink and downlink data buffering conditions, and uplink and downlink delays or a round-trip delay, throughput, uplink and downlink transmission rates, etc.), to the session management function through a N4 interface.

9. The session management function may report the QoS related parameters to the edge network exposure function by sending a second message. For example, the second message may be an SMF event exposure notification message (Nsmf_EventExposure_notify), which can also adopt other names, but their functions are the same. Furthermore, the edge network exposure function may send information of the QoS related parameters to the application function.

10. The central network exposure function may send the first request message to the management service function. For example, the first request message may be a parameter exposure enable request (Parameter Exposure enable requests), which can also adopt other names, but their functions are the same. The request message may include an edge network exposure function ID and first network parameter type information (network parameter type). The first network parameter type information may include type information of wireless network information (radio network information). A first reply message for the first request may be received from the management service function.

11. After receiving the first request message, the management service function may directly send the wireless network information to the edge network exposure function, and the edge network exposure function may then directly send relevant parameter information to the application function.

12. The central network exposure function may send a third request message to the session management function. For example, the third request message may be a parameter disable request (Parameter disable request), or an event exposure subscribe request (EventExposure_subscribe) or an event exposure unsubscribe request (EventExposure_unsubscribe), which includes instruction information for canceling a direct transmission of network parameters to an edge NEF, and may also use other names, but their functions are the same. It can be used to cancel an operation of the session management function for directly reporting the parameters to the application function through the edge network exposure function.

13. The central network exposure function may configure and cancel an instantiation of the edge network exposure function.

Figure 10:
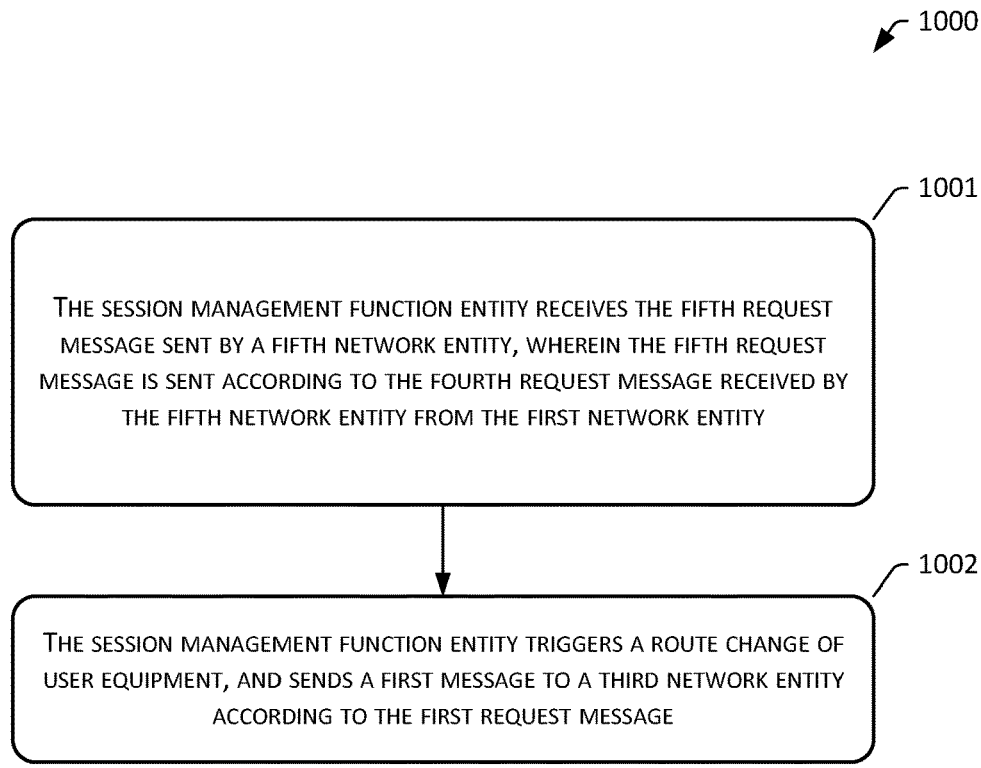
FIG. 10 is a flowchart of another network communication method according to an embodiment of the present disclosure.

FIG. 10 shows a flowchart of another network communication method 1000 provided by an embodiment of the present disclosure. The method 1000 can be applied to the side of a second network entity. The second network entity may include a session management function entity. A process of receiving a first request message from a first network entity may be realized by receiving a fourth request message and a fifth request message, and may specifically include the following steps:

Step 1001: The session management function entity receives the fifth request message sent by a fifth network entity, wherein the fifth request message is sent according to the fourth request message received by the fifth network entity from the first network entity.

When the central network exposure function dynamically manages the edge network exposure function, the session management function entity may receive a fifth request message sent by the fifth network entity. The fifth request message may be sent according to the fourth request message that is sent from the first network entity to the fifth network entity.

In an example, by receiving the fourth request message and the fifth request message, the session management function entity may receive the first request message sent by the first network entity. In other words, parameter information in the first request message may be obtained through the fourth request message and the fifth request message.

For example, a central network exposure function may send a fourth request message to a fifth network entity. The fourth request message may be a PCF policy authentication subscribe request message (Npcf_PolicyAuthorization_Subscribe Request), or a PCF policy authentication. create or update request message (Npcf_PolicyAuthorization_Create/Update Request), which can also adopt other names with the same function. The request message may include an edge network exposure function ID and in implementations, first network parameter type information (network parameter type). The first network parameter type information may also be an event ID, and the first network parameter type information may include type information, such as type information of quality parameters QoS (such as at least one of uplink and downlink data buffering conditions, uplink and downlink delays or a round-trip delay, throughput, uplink and downlink transmission rates, etc.), type information of a route change parameter (UP route change), etc. In implementations, the fourth request message may not include network parameter type information. When no relevant network parameter type information is indicated, a 5G core network element (such as SMF or AMF) can notify an AF of designated default parameters or all parameters through a local NEF. In addition, the central network exposure function may receive a related reply message sent by the fifth network entity for the fourth request message. In implementations, the fourth request message may further include an AF identifier and a local event notification identifier. The fifth network entity may indicate, through the local event notification identifier, a corresponding 5G core network element (for example, SMF or AMF) to notify specified types of network parameters to a specified AF through the edge network exposure function.

After the fifth network entity receives the fourth request message sent by the central network exposure function, the session management function entity may receive the fifth request message sent by the fifth network entity according to the fourth request message. The fifth request message may be an SMF event exposure subscribe request message (Nsmf_EventExposure_Subscribe Request) or a PCF session management policy control update notification request message (Npcf_SMPolicyControl_UpdateNotify Request), which can also adopt other names with the same function. The request message may include an edge network exposure function ID and first network parameter type information (network parameter type). The first network parameter type information may include type information such as type information of quality parameters QoS (such as at least one of uplink and downlink data buffering conditions, uplink and downlink delays or a round-trip delay, throughput, uplink and downlink transmission rates, etc.), type information of a route change parameter (UP route change). In addition, the session management function entity may send a related reply message for the fifth request message to the fifth network entity. PCF will use a local-time notification as a part of a policy and charging control rule (PCC rule), which is used to indicate a corresponding UPF through SMF to notify specify AF of QoS related parameters (such as at least one of uplink and downlink data buffering conditions, uplink and downlink delays or a round-trip delay, throughput, uplink and downlink transmission rates, etc.) via a local NEF.

In an example, if an unsubscribe request message (unsubscribe) is sent, it can also be performed through a similar process. For example, a request message can be sent to the policy control function through the central network exposure function, and the request message can be a PCF policy authentication unsubscribe request message (Npcf_PolicyAuthorization_Unsubscribe Request), or a PCF policy authentication create or update request message (Npcf_PolicyAuthorization_Create/Update Request), which can also adopt other names with the same function. The request message may include an edge network exposure function ID and in implementations, first network parameter type information (network parameter type). The first network parameter type information may also be an event ID. The first network parameter type information may include type information, such as type information of quality parameters QoS (such as at least one of uplink and downlink data buffering conditions, uplink and downlink delays or a round-trip delay, throughput, uplink and downlink transmission rates, etc.), type information of a route change parameter (UP route change). In implementations, the request message may not include network parameter type information. When no relevant network parameter type information is indicated, a 5G core network element (such as SMF or AMF) can notify an AF of designated default parameters or all parameters through a local NEF. In addition, the central network exposure function may receive a related reply message sent by the policy control function for the fourth request message. In implementations, the request message may further include an AF identifier and a local event notification identifier. The policy control function may indicate, through the local event notification identifier, a corresponding 5G core network element (for example, SMF or AMF) to notify specified types of network parameters to a specified AF through the edge network exposure function.

After the policy control function receives the request message sent by the central network exposure function, the policy control function may send a request message to the session management function entity according to the request message. The request message may be an SMF event exposure subscribe request message (Nsmf_EventExposure_Subscribe Request) or a PCF session management policy control update notification request message (Npcf_SMPolicyControl_UpdateNotify Request), which can also adopt other names with the same functions. The request message may include an edge network exposure function ID and first network parameter type information (network parameter type). The first network parameter type information may include type information, such as type information of quality parameters QoS (such as at least one of uplink and downlink data buffering conditions, uplink and downlink delays or a round-trip delay, throughput, uplink and downlink transmission rates, etc.), type information of a route change parameter (UP route change). In addition, the policy control function may receive a related reply message for the request message from the session management function entity. The PCF can remove a local-time notification from a policy and charging control rule (PCC rule). In this case, the UPF cannot notify the AF of relevant parameters through the local NEF.

In implementations, the method may further include the following step:

the session management function entity sending a sixth request message to a user plane function entity, to cause the user plane function entity to send a third message to the fourth network entity through a seventh network entity, wherein the third message includes first parameter information.

As an example, the first parameter information may be at least one of uplink and downlink data buffering conditions, uplink and downlink delays or a round-trip delay, throughput, and uplink and downlink transmission rates.

In practical applications, the session management function entity may send a sixth request message to a user plane function entity, so that the user plane function entity may send a third message to an application function through a local network exposure function. The third message may include at least one of uplink and downlink data buffering conditions, uplink and downlink delays or a round-trip delay, throughput, uplink and downlink transmission rates, etc.

In an example, if the session management function entity is far away from the edge domain or the local network exposure function, the session management function entity can send a request message to the user plane function entity through a N4 report interface, so that the user plane function entity can send the QoS parameters to the application function through the local network exposure function.

Step 1002: The session management function entity triggers a route change of user equipment, and sends a first message to a third network entity according to the first request message.

Figure 11:
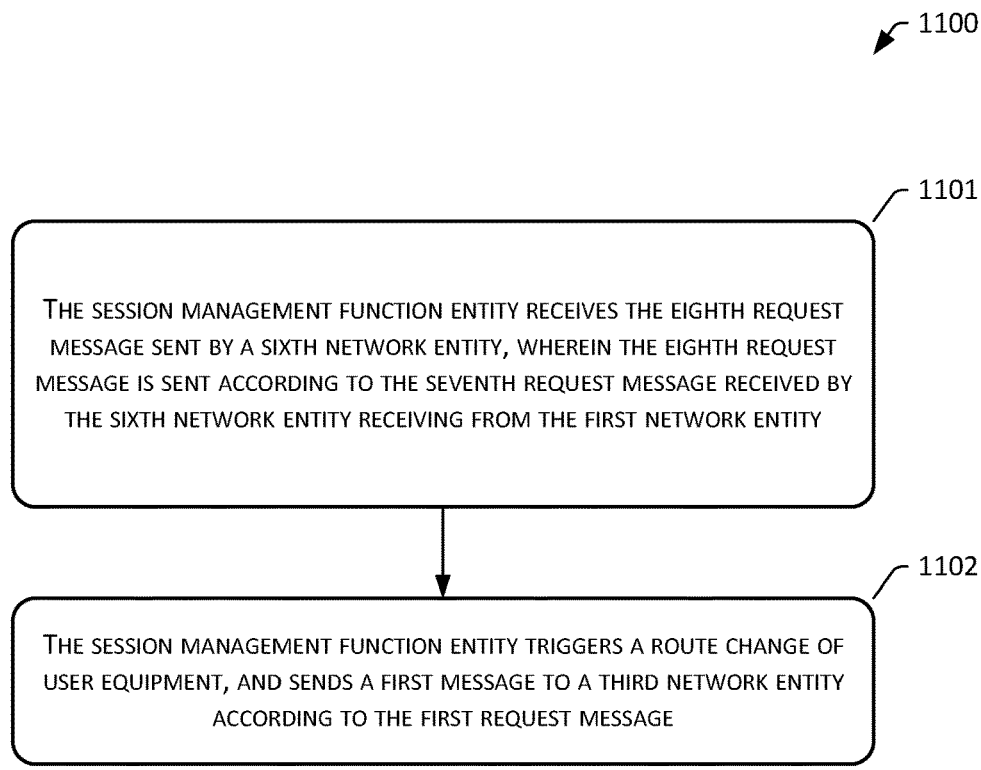
FIG. 11 is a flowchart of another network communication method provided by an embodiment of the present disclosure.

FIG. 11 shows a flowchart of another network communication method 1100 provided by an embodiment of the present disclosure. The method 1100 can be applied to the side of a first network entity, and the second network entity may include a session management function entity. A process of receiving a first request message sent by the first network entity may be implemented by receiving a seventh request message and an eighth request message, and may specifically include the following steps:

Step 1101: The session management function entity receives the eighth request message sent by a sixth network entity, wherein the eighth request message is sent according to the seventh request message received by the sixth network entity receiving from the first network entity.

In a process of dynamic managing an instantiation of an edge network exposure function by a central network exposure function, the session management function entity may receive an eighth request message sent by a sixth network entity. The eighth request message may be sent according to a seventh request message that is sent from the first network entity to the sixth network entity.

In an example, by receiving the seventh request message and the eighth request message, the session management function entity can receive the first request message sent by the first network entity. In other words, parameter information in the first request message can be obtained through the seventh request message and the eighth request message.

For example, the central network exposure function can send a seventh request message to the sixth network entity. The seventh request message can be a UDM event exposure subscribe request message (Nudm_EventExposure_Subscribe Request), which can also adopt other names with the same function. The request message may include an edge network exposure function ID and first network parameter type information (network parameter type). The first network parameter type information may also be an event ID, and the first network parameter type information may include type information, such as type information of quality parameters QoS (such as at least one of uplink and downlink data buffering conditions, uplink and downlink delays or a round-trip delay, throughput, uplink and downlink transmission rates, etc.), type information of a route change parameter (UP route change), etc. In implementations, the seventh request message may not include network parameter type information. When no relevant network parameter type information is indicated, a 5G core network element (such as SMF or AMF) can notify an AF of designated default parameters or all parameters through a local NEF. In addition, the central network exposure function may receive a related reply message sent by the sixth network entity for the seventh request message. In implementations, the seventh request message may further include an AF identifier and a local event notification identifier. The sixth network entity may indicate, through the local event notification identifier, a corresponding 5G core network element (for example, SMF or AMF) to notify specified types of network parameters to a specified AF through the edge network exposure function.

After the sixth network entity receives the seventh request message sent by the central network exposure function, the session management function entity may receive the eighth request message sent by the sixth network entity according to the seventh request message. The eighth request message may be an SMF event exposure subscribe request message (Nsmf_EventExposure_Subscribe Request). The request message may include an edge network exposure function ID and first network parameter type information (network parameter type). The first network parameter type information may include type information such as type information of quality parameters QoS (such as at least one of uplink and downlink data buffering conditions, uplink and downlink delays or a round-trip delay, throughput, uplink and downlink transmission rates, etc.), type information of a route change parameter (UP route change). In addition, the session management function entity may send a related reply message to the sixth network entity in response to the eighth request message.

Step 1102: The session management function entity triggers a route change of user equipment, and sends a first message to a third network entity according to the first request message.

It should be noted that the method embodiments are all expressed as a series of action combinations for the ease of description. One skilled in the art, however, should know that the embodiments of the present disclosure are not limited by the described sequences of actions, because some steps may be performed in other orders or in parallel according to the embodiments of the present disclosure. Also, one skilled in the art should also know that the embodiments described in the specification are all exemplary embodiments, and actions involved may not necessarily be required by the embodiments of the present disclosure.

A network communication apparatus provided by an embodiment of the present disclosure can be applied to the side of a first network entity. The apparatus may include one or more processors and memory storing executable instructions that, when executed by the one or more processors, cause the one or more processors to perform acts including:

sending a first request message to a second network entity, wherein the first request message includes at least one piece of first network parameter type information, the first request message is used to enable the second network entity to be triggered to send a first message to a third network entity according to a preset event, the first message includes at least one portion of network parameter information corresponding to the first network parameter type information; and receiving a first reply message returned by the second network entity in response to the first request message.

In implementations, the first request message includes identification information of the third network entity.

In implementations, the first request message further includes identification information of a fourth network entity, and the identification information of the fourth network entity is used to enable the second network entity to send the first message to the third network entity according to an application corresponding to the fourth network entity.

In implementations, the second network entity includes a session management function entity, and when the second network entity is the session management function entity, the first network parameter type information includes at least one of the following:

type information of quality parameters and type information of route change parameters.

The first message includes at least one of the following:

data network access identification and routing information.

In implementations, the second network entity includes an access management function entity, and when the second network entity is the access management function entity, the first network parameter type information includes type information of a location of user equipment, and the first message includes location information of the user equipment.

In implementations, the second network entity includes a user plane functional entity, and when the second network entity is the user plane functional entity, the first network parameter type information includes at least one of the following:

type information of a delay, type information of a buffer region condition,

The first message includes at least one of the following:

round-trip delay information, buffer information.

In implementations, the second network entity includes a management service function entity, and when the second network entity is the management service function entity, the first network parameter type information includes type information of wireless network information, and the first message includes the wireless network information.

In implementations, the second network entity includes a session management function entity, and before the first network entity sends the first request message to the second network entity, the acts further include:

the first network entity receiving a second request message sent by a fourth network entity, wherein the second request message is used to request instantiating the third network entity.

In implementations, the second network entity includes a session management function entity, and before the first network entity sends the first request message to the second network entity, the acts further include:

the first network entity performing two-way authentication with the fourth network entity.

In implementations, the second network entity includes a user plane function entity, and after the first network entity sends the first request message to the second network entity, the acts further include:

the user plane function entity sending quality parameter information to a session management function entity, and the session management function entity forwarding the quality parameter information to the third network entity.

In implementations, the second network entity includes a management service function entity, and after the first network entity sends the first request message to the second network entity, the acts further include:

the management service function entity sending the first message to the fourth network entity through the third network entity.

In implementations, the second network entity includes a session management function entity, and the acts further include:

the first network entity sending a third request message to the second network entity, wherein the third request message is used to cancel an operation of reporting parameters to the fourth network entity by the second network entity through the third network entity; and the first network entity canceling an instantiation of the third network entity.

The second network entity includes a session management function entity, sending the first request message is implemented by sending a fourth request message and a fifth request message, and the first network entity sending the first request message to the second network entity includes:

the first network entity sending the fourth request message to a fifth network entity when the second network entity is a session management function entity, to cause the fifth network entity to send the fifth request message to the second network entity according to the fourth request message.

The acts further include:

the session management function entity sending a sixth request message to a user plane function entity, to cause the user plane function entity to send a third message to a fourth network entity through a seventh network entity, wherein the third message includes first parameter information.

The second network entity includes a session management function entity, sending the first request message is implemented by sending a seventh request message and an eighth request message, and the first network entity sending the first request message to the second network entity includes:

when the second network entity is a session management function entity, the first network entity sends the seventh request message to a sixth network entity, to cause the sixth network entity to send the eighth request message to the second network entity.

A network communication apparatus provided by an embodiment of the present disclosure may be applied to a second network entity, and the second network entity may include a session management function entity. The apparatus may include one or more processors and memory storing executable instructions that, when executed by the one or more processors, cause the one or more processors to perform acts including:

receiving a first request message sent by a first network entity, and returning a first reply message for the first request message to the first network entity, wherein the first request message includes at least one piece of first network parameter type information, the first request message is used to enable the session management function entity to be triggered to send a first message to a third network entity according to a preset event, and the first message includes at least one portion of network parameter information corresponding to the first network parameter type information; and the session management function entity triggering a routing change of user equipment and sending the first message to a third network entity according to the first request message.

In implementations, the first request message includes identification information of the third network entity.

In implementations, the first request message further includes identification information of a fourth network entity, and the identification information of the fourth network entity is used to enable the second network entity to send the first message to the third network entity according to an application corresponding to the fourth network entity.

In implementations, the first network parameter type information includes at least one of the following:

type information of quality parameters and type information of route change parameters.

The first message includes at least one of the following:

data network access identification and routing information.

In implementations, the session management function entity receiving quality parameter information sent by the user plane function entity; and the session management function entity forwarding a second message to the third network entity, wherein the second message includes the quality parameter information.

In implementations, the apparatus is further used for:

the session management function entity receiving a third request message sent by the first network entity, wherein the third request message is used to cancel an operation of parameter reporting by the session management function entity to the fourth network entity through the third network entity.

The process of receiving the first request message sent by the first network entity is implemented by receiving a fourth request message and a fifth request message, and the session management function entity receiving the first request message sent by the first network entity includes:

the session management function entity receiving a fifth request message sent by a fifth network entity, wherein the fifth request message is sent according to a fourth request message received by the fifth network entity from the first network entity.

The acts further include:

the session management function entity sending a sixth request message to the user plane function entity, to cause the user plane function entity to send a third message to the fourth network entity through a seventh network entity, wherein the third message includes first parameter information.

The process of receiving the first request message sent by the first network entity is implemented by receiving a seventh request message and an eighth request message, and the session management function entity receiving the first request message sent by the first network entity includes:

the session management function entity receiving the eighth request message sent by a sixth network entity, wherein the eighth request message is sent according to the seventh request message received by the sixth network entity from the first network entity.

An embodiment of the present disclosure also provides an electronic device, which may include a processor, a memory, and a computer program stored on the memory and capable of running on the processor, and the computer program is executed by the processor to implement the network communication method as described above.

An embodiment of the present disclosure also provides a computer-readable storage medium, the computer-readable storage medium storing a computer program, and the computer program, when is executed by a processor, implements the network communication method as described above.

Figure 12:
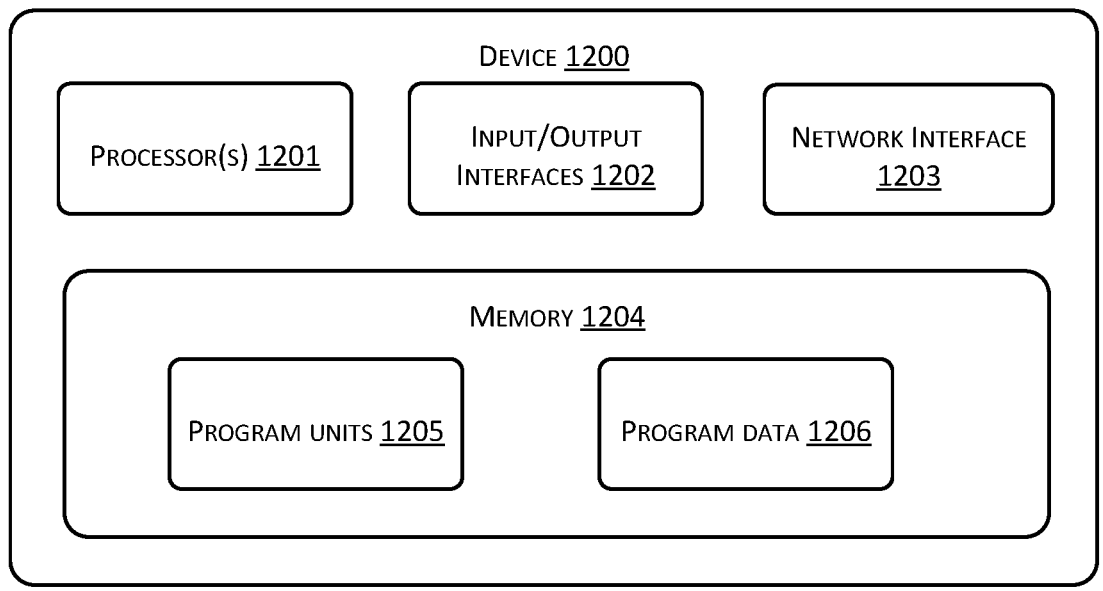
FIG. 12 is a schematic diagram of an example device.

FIG. 12 shows an example device 1200. In implementations, the example device 1200 may represent any one of the foregoing network communication apparatuses and network entities (such as the first network entity, the second network entity, etc.). By way of example and not limitation, the device 1200 may include one or more processors 1201, an input/output (I/O) interface 1202, a network interface 1203, and memory 1204.

The memory 1204 may include a form of computer readable media such as a volatile memory, a random access memory (RAM) and/or a non-volatile memory, for example, a read-only memory (ROM) or a flash RAM. The memory 1204 is an example of a computer readable media. In implementations, the memory 1204 may include program units 1205 and program data 1206.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Due to their basic similarities to the method embodiments, descriptions of the apparatus embodiments are relatively simple, and related portions can be referenced to the portions of the descriptions of the method embodiments.

Various embodiments in the present specification are described in a progressive manner. Each embodiment focuses on aspects that are different from other embodiments, and same or similar parts between the various embodiments can be referenced to each other.

One skilled in the art should understand that the embodiments of the present disclosure may be provided as a method, an apparatus, or a computer program product. Therefore, the embodiments of the present disclosure may adopt a form of a complete hardware embodiment, a complete software embodiment, or an embodiment that is a combination of software and hardware. Moreover, the embodiments of the present disclosure may adopt a form of a computer program product implemented on one or more computer-usable storage media (which include, but are not limited to, a magnetic disk storage device, CD-ROM, an optical storage device, etc.) that include computer-usable program codes.

The present disclosure is described with reference to flowcharts and/or block diagrams of methods, terminal devices (systems), and computer program products according to the embodiments of the present disclosure. It should be understood that each process and/or block in a flowchart and/or block diagram, and a combination of processes and/or blocks in the flowchart and/or block diagram can be implemented by computer program instructions. These computer program instructions can be provided to a processor of a general-purpose computer, a special-purpose computer, an embedded processor, or other programmable data processing terminal device to generate a machine, so that an apparatus used for implementing functions specified in one or more processes in a flowchart and/or one or more blocks in a block diagram is generated by executing the instructions using the processor of the computer or other programmable data processing device.

These computer program instructions can also be stored in a computer-readable storage device that can guide a computer or other programmable data processing terminal device to work in a specific way, so that the instructions stored in the computer-readable storage device produce an article of manufacture including an instruction apparatus. The instruction apparatus implements functions specified in one or more processes in a flowchart and/or one or more blocks in a block diagram.

These computer program instructions can also be loaded on a computer or other programmable data processing terminal device, so that a series of operation steps are executed on the computer or other programmable device to produce computer-implemented processing, so that the instructions executed on the computer or other programmable device provide steps for implementing functions specified in one or more processes in a flowchart and/or one or more blocks in a block diagram.

Although the exemplary embodiments of the embodiments of the present disclosure have been described, one skilled in the art can make additional changes and modifications to these embodiments once they learn the basic creative concept. Therefore, the appended claims are intended to be interpreted as including the exemplary embodiments and all the changes and modifications that fall within the scope of the embodiments of the present disclosure.

Finally, it should be noted that in this article, relational terms, such as first and second, etc., in the present text are only used to distinguish one entity or operation from another entity or operation, and do not necessarily require or imply any such actual relationship or sequence between these entities or operations. Moreover, the terms "containing", "including" or any other variations thereof are intended to cover a non-exclusive inclusion, so that a process, method, article, or terminal device that includes a series of elements includes not only these elements, but also other elements that are not explicitly listed, and elements that are inherent to such process, method, article, or terminal device. Without further limitations, an element defined by a sentence "including a . . . " does not exclude an existence of other identical elements in a process, method, article, or terminal device that includes such element.

Details of the network communication methods, apparatuses, electronic devices, and storage media that are provided have been described above. Specific examples are used in the present text to illustrate the principles and implementations of the present disclosure. The descriptions of the above embodiments are only used to help understand the methods of the present disclosure and their core ideas. At the same time, for one of ordinary skill in the art, changes in specific implementations and the scope of applications could exist according to the ideas of the present disclosure. In summary, the content of the present specification should not be construed as limiting the present disclosure.

The present disclosure can be further understood using the following clauses.

Clause 1: A network communication method, which is applied to a first network entity, comprising: the first network entity sending a first request message to a second network entity, wherein the first request message includes at least one piece of first network parameter type information, the first request message is used to enable the second network entity to be triggered to send a first message to a third network entity according to a preset event, the first message includes at least one portion of network parameter information corresponding to the first network parameter type information; and the first network entity receiving a first reply message returned by the second network entity in response to the first request message.

Clause 2: The method according to Clause 1, wherein the first request message includes identification information of the third network entity.

Clause 3: The method according to Clause 1 or 2, wherein the first request message further includes identification information of a fourth network entity, and the identification information of the fourth network entity is used to enable the second network entity to send the first message to the third network entity according to an application corresponding to the fourth network entity.

Clause 4: The method according to Clause 1, wherein the second network entity includes a session management function entity, and when the second network entity is the session management function entity, the first network parameter type information includes at least one of the following: type information of quality parameters and type information of route change parameters; and the first message includes at least one of the following: data network access identification and routing information.

Clause 5: The method according to Clause 1, wherein the second network entity includes an access management function entity, and when the second network entity is the access management function entity, the first network parameter type information includes type information of a location of user equipment, and the first message includes location information of the user equipment.

Clause 6: The method according to Clause 1, wherein the second network entity includes a user plane functional entity, and when the second network entity is the user plane functional entity, the first network parameter type information includes at least one of the following: type information of a delay, type information of a buffer region condition, and the first message includes at least one of the following: round-trip delay information, buffer information.

Clause 7: The method according to Clause 1, wherein the second network entity includes a management service function entity, and when the second network entity is the management service function entity, the first network parameter type information includes type information of wireless network information, and the first message includes the wireless network information.

Clause 8: The method according to Clause 1, wherein the second network entity includes a session management function entity, and before the first network entity sends the first request message to the second network entity, the method further includes: the first network entity receiving a second request message sent by a fourth network entity, wherein the second request message is used to request instantiating the third network entity.

Clause 9: The method according to Clause 8, wherein the second network entity includes a session management function entity, and before the first network entity sends the first request message to the second network entity, the method further includes: the first network entity performing two-way authentication with the fourth network entity.

Clause 10: The method according to Clause 1, wherein the second network entity includes a user plane function entity, and after the first network entity sends the first request message to the second network entity, the method further includes: the user plane function entity sending quality parameter information to a session management function entity, and the session management function entity forwarding the quality parameter information to the third network entity.

Clause 11: The method according to Clause 1, wherein the second network entity includes a management service function entity, and after the first network entity sends the first request message to the second network entity, the method further includes: the management service function entity sending the first message to the fourth network entity through the third network entity.

Clause 12: The method according to Clause 1, wherein the second network entity includes a session management function entity, and the method further includes: the first network entity sending a third request message to the second network entity, wherein the third request message is used to cancel an operation of reporting parameters to the fourth network entity by the second network entity through the third network entity; and the first network entity canceling an instantiation of the third network entity.

Clause 13: The method according to Clause 1, wherein the second network entity includes a session management function entity, sending the first request message is implemented by sending a fourth request message and a fifth request message, and the first network entity sending the first request message to the second network entity includes: the first network entity sending the fourth request message to a fifth network entity when the second network entity is a session management function entity, to cause the fifth network entity to send the fifth request message to the second network entity according to the fourth request message.

Clause 14: The method according to Clause 13, further comprising: the session management function entity sending a sixth request message to a user plane function entity, to cause the user plane function entity to send a third message to a fourth network entity through a seventh network entity, wherein the third message includes first parameter information.

Clause 15: The method according to Clause 1, wherein the second network entity includes a session management function entity, sending the first request message is implemented by sending a seventh request message and an eighth request message, and the first network entity sending the first request message to the second network entity includes: when the second network entity is a session management function entity, the first network entity sends the seventh request message to a sixth network entity, to cause the sixth network entity to send the eighth request message to the second network entity.

Clause 16: A network communication method, which is applied to a second network entity, wherein the second network entity comprises a session management function entity, and the method comprises: the session management function entity receiving a first request message sent by a first network entity, and returning a first reply message for the first request message to the first network entity, wherein the first request message includes at least one piece of first network parameter type information, the first request message is used to enable the session management function entity to be triggered to send a first message to a third network entity according to a preset event, and the first message includes at least one portion of network parameter information corresponding to the first network parameter type information; and the session management function entity triggering a routing change of user equipment and sending the first message to a third network entity according to the first request message.

Clause 17: The method according to Clause 16, wherein the first request message includes identification information of the third network entity.

Clause 18: The method according to Clause 16 or 17, wherein the first request message further includes identification information of a fourth network entity, and the identification information of the fourth network entity is used to enable the second network entity to send the first message to the third network entity according to an application corresponding to the fourth network entity.

Clause 19: The method according to Clause 16, wherein the first network parameter type information includes at least one of the following: type information of quality parameters and type information of route change parameters; and the first message includes at least one of the following: data network access identification and routing information.

Clause 20: The method according to Clause 16, further comprising: the session management function entity receiving quality parameter information sent by the user plane function entity; and the session management function entity forwarding a second message to the third network entity, wherein the second message includes the quality parameter information.

Clause 21: The method according to Clause 16, further comprising: the session management function entity receiving a third request message sent by the first network entity, wherein the third request message is used to cancel an operation of parameter reporting by the session management function entity to the fourth network entity through the third network entity.

Clause 22: The method according to Clause 16, wherein receiving the first request message sent by the first network entity is implemented by receiving a fourth request message and a fifth request message, and the session management function entity receiving the first request message sent by the first network entity includes: the session management function entity receiving a fifth request message sent by a fifth network entity, wherein the fifth request message is sent according to a fourth request message received by the fifth network entity from the first network entity.

Clause 23: The method according to Clause 22, further comprising: the session management function entity sending a sixth request message to the user plane function entity, to cause the user plane function entity to send a third message to the fourth network entity through a seventh network entity, wherein the third message includes first parameter information.

Clause 24: The method according to Clause 16, wherein receiving the first request message sent by the first network entity is implemented by receiving a seventh request message and an eighth request message, and the session management function entity receiving the first request message sent by the first network entity includes: the session management function entity receiving the eighth request message sent by a sixth network entity, wherein the eighth request message is sent according to the seventh request message received by the sixth network entity from the first network entity.

Clause 25: A network communication apparatus, which is applied to a first network entity, the apparatus being used for: sending a first request message to a second network entity, wherein the first request message includes at least one piece of first network parameter type information, the first request message is used to enable the second network entity to be triggered to send a first message to a third network entity according to a preset event, the first message includes at least one portion of network parameter information corresponding to the first network parameter type information; and receiving a first reply message returned by the second network entity in response to the first request message.

Clause 26: A network communication apparatus, which is applied to a second network entity, wherein the second network entity comprises a session management function entity, and the apparatus is used for: the session management function entity receiving a first request message sent by a first network entity, and returning a first reply message for the first request message to the first network entity, wherein the first request message includes at least one piece of first network parameter type information, the first request message is used to enable the session management function entity to be triggered to send a first message to a third network entity according to a preset event, and the first message includes at least one portion of network parameter information corresponding to the first network parameter type information; and triggering a routing change of user equipment and sending the first message to a third network entity according to the first request message.

Clause 27: An electronic device comprising: a processor, a memory, and a computer program stored on the memory and capable of running on the processor, and the computer program is executed by the processor to implement the network communication method as recited in any one of Clauses 1-24.

Clause 28: A computer-readable storage medium, wherein the computer-readable storage medium stores a computer program, and the computer program, when is executed by a processor, implements the network communication method as recited in any one of Clauses 1-24.

What is claimed is:

1. A method implemented by a first network entity, the method comprising:
   receiving a second request message sent by a fourth network entity, wherein the second request message is used to request instantiating a third network entity;
   after receiving the second request message, sending a first request message to a second network entity, wherein:
      the second network entity includes a session management function entity,
      the first request message includes at least one piece of first network parameter type information,
      the first request message is used to enable the second network entity to be triggered to send a first message to the third network entity according to a preset event, and
      the first message includes at least one portion of network parameter information corresponding to the first network parameter type information; and
   receiving a first reply message returned by the second network entity in response to the first request message.

2. The method according to claim 1, wherein the first request message includes identification information of the third network entity.

3. The method according to claim 1, wherein the first request message further includes identification information of the fourth network entity, and the identification information of the fourth network entity is used to enable the second network entity to send the first message to the third network entity according to an application corresponding to the fourth network entity.

4. The method according to claim 1, wherein the second network entity further includes a session management function entity, and when the second network entity includes the session management function entity, the first network parameter type information includes at least one of: type information of quality parameters and type information of route change parameters; and the first message includes at least one of: data network access identification and routing information.

5. The method according to claim 1, wherein the second network entity includes further an access and mobile management function, and when the second network entity includes the access and mobile management function, the first network parameter type information includes type information of a location of user equipment, and the first message includes location information of the user equipment.

6. The method according to claim 1, wherein the second network entity further includes a user plane functional entity, and when the second network entity includes the user plane functional entity, the first network parameter type information includes at least one of: type information of a delay, type information of a buffer region condition, and the first message includes at least one of: round-trip delay information, buffer information.

7. The method according to claim 1, wherein the second network entity further includes a management service function entity, and when the second network entity includes the management service function entity, the first network parameter type information includes type information of wireless network information, and the first message includes the wireless network information.

8. The method according to claim 1, further comprising:
the first network entity performing two-way authentication with the fourth network entity.

9. The method according to claim 1, wherein the second network entity further includes a user plane function entity, and after sending the first request message to the second network entity, the method further includes:
the user plane function entity sending quality parameter information to the session management function entity, and the session management function entity forwarding the quality parameter information to the third network entity.

10. The method according to claim 1, wherein the second network entity further includes a management service function entity, and after sending the first request message to the second network entity, the method further includes:
the management service function entity sending the first message to the fourth network entity through the third network entity.

11. The method according to claim 1, wherein further comprising:
sending a third request message to the second network entity, wherein the third request message is used to cancel an operation of reporting parameters to the fourth network entity by the second network entity through the third network entity; and
canceling an instantiation of the third network entity.

12. The method according to claim 1, wherein sending the first request message is implemented by sending a fourth request message and a fifth request message, and sending the first request message to the second network entity includes:
sending the fourth request message to a fifth network entity when the second network entity includes the session management function entity, to cause the fifth network entity to send the fifth request message to the second network entity according to the fourth request message.

13. One or more non-transitory computer readable media storing executable instructions that, when executed by one or more processors of a second network entity, cause the one or more processors to perform acts comprising:
receiving a first request message sent by a first network entity, and returning a first reply message for the first request message to the first network entity, wherein the first request message includes at least one piece of first network parameter type information, the first request message is used to enable the second network entity to be triggered to send a first message to a third network entity according to a preset event, and the first message includes at least one portion of network parameter information corresponding to the first network parameter type information;

triggering a routing change of user equipment and sending the first message to a third network entity according to the first request message;

receiving quality parameter information sent by a user plane function entity; and forwarding a second message to the third network entity, wherein the second message includes the quality parameter information.

14. The one or more non-transitory computer readable media according to claim 13, wherein the first request message includes identification information of the third network entity.

15. The one or more non-transitory computer readable media according to claim 13, wherein the first request message further includes identification information of a fourth network entity, and the identification information of the fourth network entity is used to enable the second network entity to send the first message to the third network entity according to an application corresponding to the fourth network entity.

16. The one or more non-transitory computer readable media according to claim 13, the acts further comprising:
receiving a third request message sent by the first network entity, wherein the third request message is used to cancel an operation of parameter reporting to a fourth network entity through the third network entity.

17. The one or more non-transitory computer readable media according to claim 13, wherein receiving the first request message sent by the first network entity is implemented by receiving a fourth request message and a fifth request message, and receiving the first request message sent by the first network entity includes:
receiving a fifth request message sent by a fifth network entity, wherein the fifth request message is sent according to a fourth request message received by the fifth network entity from the first network entity.

18. An apparatus comprising:
one or more processors; and
memory storing executable instructions that, when executed by the one or more processors, cause the one or more processors to perform acts comprising:
sending a first request message to a second network entity, wherein:
the second network entity includes a session management function entity,
the first request message includes at least one piece of first network parameter type information,
the first request message is used to enable the second network entity to be triggered to send a first message to a third network entity according to a preset event, and
the first message includes at least one portion of network parameter information corresponding to the first network parameter type information;
receiving a first reply message returned by the second network entity in response to the first request message;

sending a third request message to the second network entity, wherein the third request message is used to cancel an operation of reporting parameters to a fourth network entity by the second network entity through the third network entity; and canceling an instantiation of the third network entity.

* * * * *